United States Patent [19]

Koleske

[11] Patent Number: 4,725,653
[45] Date of Patent: Feb. 16, 1988

[54] LOW VISCOSITY ADDUCTS OF A POLYCAPROLACTONE POLYOL AND A POLYEPOXIDE

[75] Inventor: Joseph V. Koleske, Charleston, W. Va.

[73] Assignee: Union Carbide Corporation, Danbury, Conn.

[21] Appl. No.: 797,471

[22] Filed: Nov. 13, 1985

Related U.S. Application Data

[62] Division of Ser. No. 546,113, Oct. 27, 1983, Pat. No. 4,629,779.

[51] Int. Cl.$^4$ .................................................. C08L 63/00
[52] U.S. Cl. ................................. 525/510; 522/170; 525/482; 525/511; 525/514; 528/90; 528/103; 528/110; 528/361
[58] Field of Search ............... 525/510, 511, 514, 482, 525/507; 528/110, 103, 361, 90; 522/170

[56] References Cited

U.S. PATENT DOCUMENTS

| | | | |
|---|---|---|---|
| 2,750,395 | 6/1956 | Phillips et al. | 260/348 |
| 2,890,194 | 6/1959 | Phillips et al. | 260/45.4 |
| 3,018,262 | 1/1962 | Schroeder | 260/29.2 |
| 3,169,945 | 2/1965 | Hostettler et al. | 260/78.3 |
| 3,318,822 | 5/1967 | Batzer et al. | 260/2 |
| 3,398,102 | 8/1968 | Soldatos et al. | 528/406 |
| 3,772,326 | 11/1973 | Batzer et al. | 528/405 |
| 3,842,019 | 10/1974 | Kropp | 260/2 EP |
| 3,896,303 | 7/1975 | Gerkin et al. | 260/78.3 R |
| 3,907,719 | 9/1975 | Habermeier et al. | 528/406 |
| 3,948,916 | 4/1976 | Porret et al. | 528/406 |
| 4,045,474 | 8/1977 | Taller et al. | 260/484 A |
| 4,058,401 | 11/1977 | Crivello | 96/115 R |
| 4,069,055 | 1/1978 | Crivello | 96/115 R |
| 4,070,509 | 1/1978 | Garner et al. | 427/385 R |
| 4,086,294 | 4/1978 | Koleske et al. | 260/834 |
| 4,126,527 | 11/1978 | Kaufman | 204/159.22 |
| 4,138,255 | 2/1979 | Crivello | 96/35.1 |
| 4,163,029 | 7/1979 | Smith et al. | 525/449 |
| 4,188,472 | 2/1980 | Chang | 528/75 |
| 4,231,951 | 11/1980 | Smith et al. | 260/446 |
| 4,256,828 | 3/1981 | Smith | 430/280 |
| 4,261,871 | 4/1981 | Smith et al. | 260/18 EP |
| 4,525,258 | 6/1985 | Watanabe et al. | 204/159.23 |
| 4,599,401 | 7/1986 | Koleske | 528/408 |

FOREIGN PATENT DOCUMENTS 582526  9/1959  Canada .................................. 528/406

*Primary Examiner*—Earl Nielsen
*Attorney, Agent, or Firm*—Jean B. Mauro

[57] ABSTRACT

This invention is directed to adducts of a polycaprolactone polyol and a polyepoxide comprising the reaction product of at least one polycaprolactone polyol and a polyepoxide containing two or more epoxy groups per molecule in a molar ratio of polycaprolactone polyol to polyepoxide of from about 2:1 to about 3:1, said adducts having an oxirane content of less than about 0.10 percent and a viscosity of less than about 3700 centistokes at 54.5° C. The adducts are useful in the formulation of high solids coating compositions, polyurethane elastomers, inks, sealants, adhesives and the like.

34 Claims, No Drawings

LOW VISCOSITY ADDUCTS OF A POLYCAPROLACTONE POLYOL AND A POLYEPOXIDE

This is a division of application Ser. No. 546,113, filed Oct. 27, 1983, issued as U.S. Pat. No. 4,629,779 on Dec. 16, 1986.

BRIEF SUMMARY OF THE INVENTION

1. Technical Field

This invention is directed in general to low viscosity adducts of a polycaprolactone polyol and a polyepoxide and a process for the preparation thereof, which adducts are useful for the formulation of high solids coatings, polyurethane elastomers, inks, sealants, adhesives and the like.

2. Background Art

Products prepared from the reaction of a polycaprolactone polyol and a polyepoxide are known in the art. See, for example, U.S. Pat. No. 3,896,303 to Gerkin and Comstock. One of the disadvantages associated with many products prepared in the prior art is their relatively high viscosities, which present problems in their manufacture and use. The use of these high viscosity products in the preparation of curable high solids coatings oftentimes necessitates the addition of solvents, resulting in curable coating compositions which may not necessarily be curable high solids coating compositions. The amount of organic solvents present in curable high solids coating compositions should be minimal which results in little or no atmospheric pollution during the curing process of the coating composition.

In the absence of such viscosity-reducing solvents, the high viscosity of many of these curable coating compositions prepared in the prior art precludes the application thereof to suitable substrates by conventional techniques such as roll coating, spray and other methods of application. Further, the solvents must be volatilized at some point during the curing process and such volatilization will expend additional energy, waste raw materials and negate the atmospheric pollution benefits of high solids coatings. This is significant in that governmental regulations have placed ever increasing restrictions on the amounts and types of organic volatiles permitted to escape into the atmosphere from coating compositions.

U.S. Pat. No. 3,896,303 to Gerkin and Comstock discloses high viscosity polyol compositions prepared by the reaction of (1) a caprolactone polyol having an average of at least three hydroxyl groups per molecule and (2) a polyepoxide having at least two vicinal epoxy groups per molecule. See Comparative Example A herein and also Control 5 in U.S. Pat. No. 4,045,474. These high viscosity polyol compositions can be reacted with aliphatic polyisocyanates to produce polyurethane coatings useful in high performance applications. Such coatings exhibit the characteristics of high hardness, good impact resistance, low temperature flexibility and chemical resistance.

U.S. Pat. No. 4,045,474 to Taller and Elder describes high functionality polyol compositions having a viscosity of less than 5,000 centistokes at 54.5° C. and an equivalent weight of at least 150. See Comparative Examples B through E herein. These high functionality polyol compositions are prepared by reacting (1) at least two polycaprolactone polyols differing in average hydroxyl number by an amount of from 250 to 400 and having average hydroxyl numbers of from about 180 to about 600 and (2) a cycloaliphatic diepoxide. Such polyol compositions can be used with particular advantage in forming light stable polyurethane coatings having a good balance of hardness, flexibility and abrasion resistance as well as weatherability and chemical resistance.

DISCLOSURE OF THE INVENTION

It has been found as a result of the present invention that adducts of a polycaprolactone polyol and a polyepoxide can be prepared which have both an oxirane content of less than about 0.10 percent and a viscosity of less than about 3700 centistokes at 54.5° C. These low viscosity adducts are the reaction product of at least one polycaprolactone polyol and a polyepoxide containing two or more epoxy groups per molecule in a molar ratio of polycaprolactone polyol to polyepoxide of from about 2:1 to about 3:1. The low viscosity adducts of this invention can be blended with suitable crosslinking agents such as polyepoxides, polyisocyanates, melamine formaldehyde resins, urea formaldehyde resins, benzoguanamine formaldehyde resins and the like and made into curable high solids coating compositions which require little or no organic solvent to improve flowability during application by conventional methods to a suitable surface or substrate. Cured coatings prepared from these curable high solids coating compositions containing a low viscosity adduct of a polycaprolactone polyol and a polyepoxide exhibit highly desirable coating properties.

In one embodiment the present invention is directed to adducts of a polycaprolactone polyol and a polyepoxide comprising the reaction product of at least one polycaprolactone polyol and a polyepoxide containing two or more epoxy groups per molecule in a molar ratio of polycaprolactone polyol to polyepoxide of from about 2:1 to about 3:1, said adducts having an oxirane content of less than about 0.10 percent and a viscosity of less than about 3700 centistokes at 54.5° C.

In another embodiment the present invention is directed to adducts of a polycaprolactone polyol and a polyepoxide comprising the reaction product of at least one polycaprolactone polyol and a polyglycidyl epoxide containing two or more epoxy groups per molecule, said polycaprolactone polyol being employed in an amount at least sufficient to effect substantially complete reaction of the epoxy groups of the polyglycidyl epoxide.

In yet another embodiment the present invention is directed to adducts of a polycaprolactone polyol and a polyepoxide comprising the reaction product of one polycaprolactone polyol and a polyepoxide containing two or more epoxy groups per molecule in a molar ratio of polycaprolactone polyol to polyepoxide of from about 2:1 to about 3:1, said adducts having an oxirane content of less than about 0.50 percent and a viscosity of less than about 20,000 centistokes at 54.5° C.

In still another embodiment the present invention is directed to a process for preparing low viscosity adducts of a polycaprolactone polyol and a polyepoxide which process comprises reacting at least one polycaprolactone polyol and a polyepoxide containing two or more epoxy groups per molecule in the presence of a sulfonic acid catalyst or derivative thereof at a temperature of from about 80° C. to about 225° C., said polycaprolactone polyol, polyepoxide and sulfonic acid catalyst or derivative thereof being employed in an amount at least sufficient to effect substantially complete reaction of the epoxy groups of the polyepoxide to give an oxirane content of less than about 0.10 percent and in a sufficiently short period of time of less than about 6 hours whereby to minimize the formation of a high viscosity product.

In yet a further embodiment the present invention is directed to a process for preparing low viscosity adducts of a polycaprolactone polyol and a polyepoxide which process comprises reacting at least one polycaprolactone polyol and a polyglycidyl epoxide containing two or more epoxy groups per molecule in the presence of a sulfonic acid catalyst or derivative thereof at a temperature of from about 80° C. to about 225° C., said polycaprolactone polyol, polyglycidyl epoxide and sulfonic acid catalyst or derivative thereof being employed in an amount at least sufficient to effect substantially complete reaction of the epoxy groups of the polyglycidyl epoxide in a sufficiently short period of time whereby to minimize the formation of a high viscosity product.

In still a further embodiment the present invention is directed to a process for preparing low viscosity adducts of a polycaprolactone polyol and a polyepoxide which process comprises reacting one polycaprolactone polyol and a polyepoxide containing two or more epoxy groups per molecule in the presence of a sulfonic acid catalyst or derivative thereof at a temperature of from about 80° C. to about 225° C., said polycaprolactone polyol, polyepoxide and sulfonic acid catalyst or derivative thereof being employed in an amount at least sufficient to effect substantially complete reaction of the epoxy groups of the polyepoxide in a sufficiently short period of time whereby to minimize the formation of a high viscosity product.

The low viscosity adducts of this invention can be blended with polyepoxides, polyisocyanates melamine formaldehydes, urea formaldehydes, benzoguanamine formaldehydes and the like to provide low viscosity curable high solids coating compositions which, after cure, give high performance coatings having improved properties such as improved flexibility and toughness of the coating. In addition to their usefulness as high solids coating compositions, the adducts of a polycaprolactone polyol and a polyepoxide of the present invention are also useful in the formulation of polyurethane elastomers, inks, sealants, adhesives and the like.

Copending U.S. patent application Ser. No. 06/546,114 filed 10/27/83, filed on an even date herewith, describes adducts of a poly(active hydrogen) organic compound and a polyepoxide comprising the reaction product of a poly(active hydrogen) organic compound and a polyepoxide containing two or more epoxy groups per molecule, said poly(active hydrogen) organic compound being employed in an amount at least sufficient to effect substantially complete reaction of the epoxy groups of the polyepoxide. The adducts are useful in the formulation of high solids coating compositions, polyurethane elastomers, inks, sealants, adhesives and the like.

Copending U.S. patent application Ser. No. 06/546,112 filed 10/27/83, filed on an even date herewith, is directed to adducts of at least two poly(active hydrogen) organic compounds and a polyepoxide comprising the reaction product of at least two poly(active hydrogen) organic compounds differing as to classification and a polyepoxide containing two or more epoxy groups per molecule, said poly(active hydrogen) organic compounds being employed in an amount at least sufficient to effect substantially complete reaction of the epoxy groups of the polyepoxide. The adducts are useful in the formulation of high solids coating compositions, polyurethane elastomers, inks, sealants, adhesives and the like.

DETAILED DESCRIPTION

The polycaprolactone polyols, alone or in admixture, that can be used to prepare the adduct compositions of this invention include any of the known polycaprolactone polyols that are commercially available and that are fully described, for example, in U.S. Pat. No. 3,169,945. As described in this patent the polycaprolactone polyols are produced by the catalytic polymerization of an excess of lactone and an organic polyfunctional initiator having as least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycols, polypropylene glycols, neopentyl glycol, 1,4-butanediol, poly(oxyethyleneoxypropylene) glycols, and similar polyalkylene glycols, either blocked, capped or heteric, containing up to about 40 or more alkyleneoxy units in the molecule, 3-methyl-1-5-pentanediol, cyclohexanediol, 4,4'-methylene-bis-cyclohexanol, 4,4'-isopropylidene-bis-cyclohexanol, xylenediol, 2-(4-hydroxymethylphenyl)ethanol, 1,6-hexanediol and the like; triols such as glycerol, trimethylolpropane, 1,2,6-hexanetriol, triethanolamine, triisopropanolamine, and the like; tetrols such as erythritol, pentaerylthritol, dipentaerythritol, sorbitol, N,N,N',N'-tetrakis(2-hydroxyethyl)ethylene diamine, and the like.

When the organic functional initiator is reacted with the caprolactone a reaction occurs that can be represented in its simplest form by the equation:

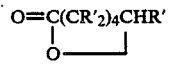

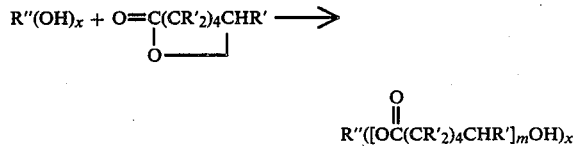

In this equation the organic functional initiator is the R"(OH)$_x$ compound and the caprolactone is the $$O=C(CR'_2)_4CHR'$$
$$|\qquad\qquad\quad|$$
$$O\rule{1em}{0.4pt}\rule{1em}{0.4pt}\rule{0.5em}{0.4pt}$$

compound; this can be epsilon caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 200 to about 6,000. The preferred polycaprolactone polyol compounds are those having an average molecular weight of from about 290 to about 6,000, most preferably from about 290 to 3,000. The most preferred are the polycaprolactone diol compounds having an average molecular weight of from about 290 to about 1,500 and the polycaprolactone triol and tetrol compounds having an average molecular weight of from about 290 to about 3,000; these are most preferred because of their low viscosity properties. In the formula m is an integer representing the average number of repeating units needed to produce the compound having said molecular weights. In the formula x is an integer having an average value of from about 2 to 8, preferably 2 to 4. The hydroxyl number of the polycaprolactone polyol can be from about 15 to 600, preferably from 200 to 500; and the polycaprolactone can have an average of from 2 to 8, preferably 2 to 4, hydroxyl groups.

Illustrative of polycaprolactone polyols that can be used in preparing the adduct compositions of this invention, one can mention the reaction products of a polyhydroxyl compound having an average from 2 to 8 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compounds; this figure is shown in the third column.

POLYCAPROLACTONE POLYOLS

| Initiator | Average MW of polyol | Average No. of CPL units in molecules |
|---|---|---|
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalene glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,398 | 7 |
| 15 Polyethylene glycol (MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 835 | 3.6 |
| 20 Polypropylene glycol (MW 1000)* | 1,684 | 6 |
| 21 Polypropylene glycol (MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4 |
| 28 1,2,6-Hexanetriol | 476 | 3 |
| 29 Trimethylolpropane | 590 | 4 |
| 30 Trimethylolpropane | 750 | 5.4 |
| 31 Trimethylolpropane | 1,103 | 8.5 |
| 32 Triethanolamine | 890 | 6.5 |
| 33 Erythritol | 920 | 7 |
| 34 Pentaerythritol | 1,219 | 9.5 |
| 35 1,4-Butanediol | 546 | 4 |
| 36 Neopentyl Glycol | 674 | 5 |

*Average molecular weight of glycol.

The structures of the compounds in the above tabulation are obvious to one skilled in the art based on the information given. The structure of compound No. 7 is:

wherein the variables r and q are integers, the sum of r+q has an average value of 3.7 and the average molecular weight is 527. The structure of compound No. 20 is:

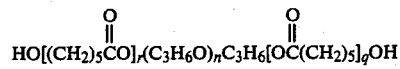

wherein the sum of r+q has an average value of 6 and the average molecular weight is 1,684. This explanation makes explicit the structural formulas of compounds 1 to 34 set forth above.

Although not specifically mentioned above, it is appreciated that other lactone based polyols can be used in preparing the adduct compositions of this invention. Illustrative of other lactone based polyols include those derived from beta-propiolactone, delta-valerolactone, zeta-enantholactone and the like including derivatives thereof such as gamma-methyl-delta-valerolactone and the like.

The polyepoxides, alone or in admixture, which may be used to prepare the adduct compositions of this invention contain two or more epoxy groups having the formula:

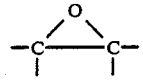

The epoxy groups can be terminal epoxy groups or internal epoxy groups. The polyepoxides are preferably cycloaliphatic epoxides. Polyglycidyl epoxides can also be used to prepare the adduct compositions of this invention. The polyepoxides are reacted with the above-described polycaprolactone polyols to produce the novel adduct compositions of this invention.

Suitable cycloaliphatic epoxide resins for purposes of this invention are those having an average of two or more epoxy groups per molecule. Illustrative of suitable cycloaliphatic epoxides are the following:

FORMULA I

Diepoxides of cycloaliphatic esters of dicarboxylic acids having the formula:

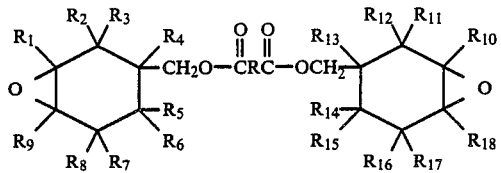

wherein $R_1$ through $R_{18}$, which can be the same or different, are hydrogen or alkyl radicals generally containing one to nine carbon atoms inclusive, and preferably containing one to three carbon atoms, inclusive, as for example methyl, ethyl, n-propyl, n-butyl, n-hexyl, 2-ethylhexyl, n-octyl, n-nonyl and the like; R is a valence bond or a divalent hydro carbon radical generally containing one to twenty carbon atoms, inclusive, and preferably, containing four to six carbon atoms, inclusive, as for example, alkylene radicals, such as trimethylene, tetramethylene, pentamethylene, hexamethylene, 2-ethylhexamethylene, octamethylene, nonamethylene, hexadecamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_{18}$ are hydrogen and R is alkylene containing four to six carbon atoms.

Among specific diepoxides of cycloaliphatic esters of dicarboxylic acids are the following:
bis(3,4-epoxycyclohexylmethyl)oxalate,
bis(3,4-epoxycyclohexylmethyl)adipate,
bis(3,4-epoxy-6-methylcyclohexylmethyl)adipate,
bis(3,4-epoxycyclohexylmethyl)pimelate, and the like.

Other suitable compounds are described in, for example, U.S. Pat. No. 2,750,395.

FORMULA II

A 3,4-epoxycyclohexylmethyl-3,4-epoxycyclohexane carboxylate having the formula:

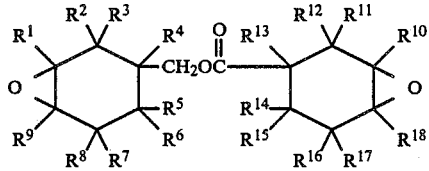

wherein $R^1$ through $R^{18}$ which can be the same or different are as defined for $R_1$ through $R_{18}$ in Formula I. Particularly desirable compounds are those wherein $R^1$ through $R^{18}$ are hydrogen.

Among specific compounds falling within the scope of Formula II are the following: 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate. Other suitable compounds are described in, for example, U.S. Pat. No. 2,890,194.

FORMULA III

Diepoxides having the formula:

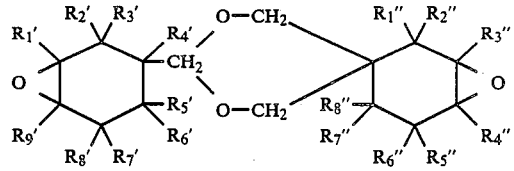

wherein the R single and double primes, which can be the same or different, are monovalent substituents such as hydrogen, halogen, i.e. chlorine, bromine, iodine or fluorine, or monovalent hydrocarbon radicals, or radicals as further defined in U.S. Pat. No. 3,318,822. Particularly, desirable compounds are those wherein all the R's are hydrogen.

Other suitable cycloaliphatic epoxides are the following:

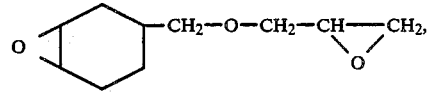

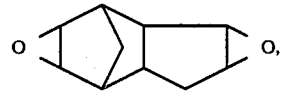

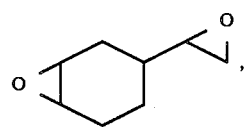

and the like.

The preferred cycloaliphatic epoxides are the following:

3,4-Epoxycyclohexylmethyl-3,4-Epoxycyclohexane carboxylate

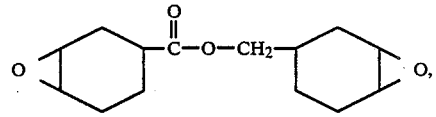

Bis(3,4-Epoxycyclohexylmethyl)adipate

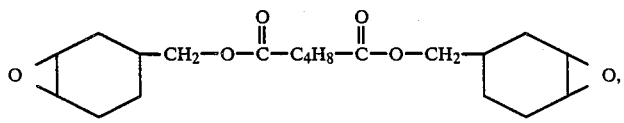

2-(3,4-Epoxycyclohexyl-5,5-spiro-3,4-epoxy)cyclohexane-meta-dioxane

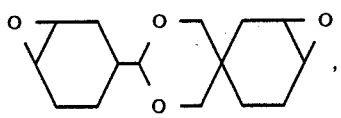

Vinylcyclohexene diepoxide

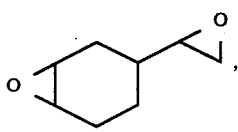

or mixtures thereof.

Suitable polyglycidyl epoxides for purposes of this invention include epoxides with six membered ring structures such as diglycidyl esters of phthalic acid, partially hydrogenated phthalic acid or fully hydrogenated phthalic acid, the diglycidyl esters of hexahydrophthalic acids being preferred. A representative diglycidyl ester of phthalic acid is the following:

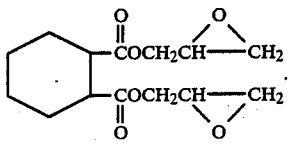

The polyglycidyl-type epoxides are preferably diglycidyl ethers of bisphenol A which are derived from bisphenol A and epichlorohydrin and have the following formula:

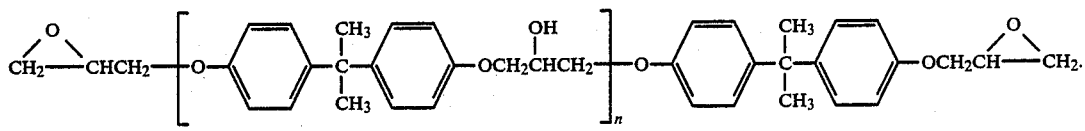

The cresol-novolac epoxy resins are multifunctional, solid polymers characterized by low ionic and hydrolyzable chlorine impurities, high chemical resistance, and thermal performance.

The epoxy phenol novolac resins are generally of the following formula:

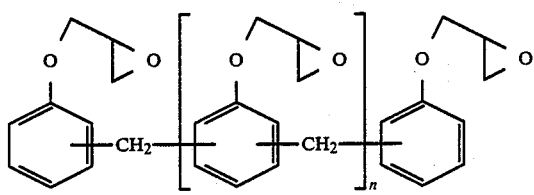

The polynuclear phenol-glycidyl ether-derived resins are generally of the formula:

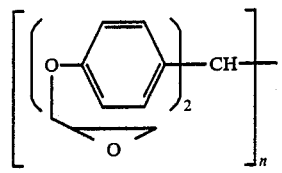

or

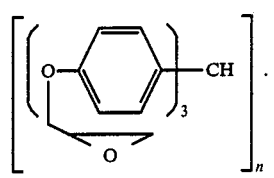

Among the aromatic and heterocyclic glycidyl amine resins which may be included herein are the following: tetraglycidylmethylenedianiline derived resins of the following formula:

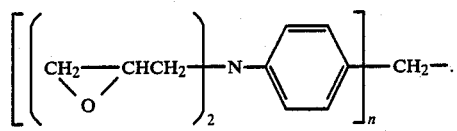

Triglycidyl-p-aminophenol derived resins, triazine based resins and hydantoin epoxy resins of the formula:

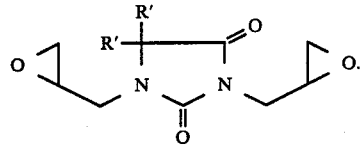

R' = CH₃

Mixtures of cycloaliphatic epoxides and polyglycidyl epoxides can also be used to prepare the adduct compositions of this invention.

The adducts of this invention are preferably prepared by reacting at least one polycaprolactone polyol and a polyepoxide in a molar ratio of polycaprolactone polyol to polyepoxide of from about 2:1 to about 3:1. Such a molar ratio range provides from about 1 to about 1.5 moles of polycaprolactone polyol for each equivalent of epoxide present in the reaction mixture. The most preferred molar ratio of polycaprolactone polyol to polyepoxide is about 2:5:1.

The adducts of this invention are prepared by reacting at least one polycaprolactone polyol and a polyepoxide in the presence of a sulfonic acid catalyst or derivative thereof. The preferred sulfonic acid catalysts and derivatives thereof include trifluoromethanesulfonic acid (triflic acid) and salts of sulfonic acid which have the general formula:

$$(R_fSO_3)_nM$$

wherein $R_f$ is fluoroalkyl (preferably perfluoroalkyl) having, for example, 1 to 18 carbons and preferably 1 to 8 carbons, M is ammonium ($-NH_4$), quaternary ammonium, cation of amine (i.e., a protonated amine), or preferably a mono- or polyvalent cation, preferably having a valence of 1–5, of a metal selected from the group consisting of metals of Groups I to V and VIII, subgroups VIB and VIIB, and those of the lanthanide and actinide series of the Periodic Table, and n is an integer equal to the valence of M. Such preferred sulfonic acid catalysts and derivatives thereof are more fully described in U.S. Pat. No. 3,842,019.

Preferred amine triflates which can be used as catalysts in the present invention include $CF_3SO_3H.N(C_6H_5)$, $CF_3SO_3H.NH_3$, $CF_3SO_3H.CH_3NH_2$, $CF_3SO_3H.(CH_3)_3N$, $CF_3SO_3H.C_2H_5NH_2$, $CF_3SO_3H.(C_2H_5)_2NH$, $CF_3SO_3H.(C_2H_5)_3N$, $CF_3SO_3H.(i-C_3H_7)_2NH$, $CF_3SO_3H.(i-C_3H_7)_2N(C_2H_5)$, $CF_3SO_3H.(i-C_3H_7)_2N(C_2H_4OH)$, $CF_3SO_3H.H_2N(C_2H_4OH)$, $CF_3SO_3H.HN(C_5H_8O)$, $CF_3SO_3H.H_2NC(CH_3)_2C-H_2OH$, $CF_3SO_3H.HN(C_6H_{11})$, $CF_3SO_3H.HN(C_2H_4OH)_2$, $CF_3SO_3.(CH_3)_4N$ and the like, including mixtures thereof.

Preferred metal salts of sulfonic acid which can be used as catalysts in the present invention include the metal salts of $CF_3SO_3H$, $C_8F_{17}SO_3H$, $CF_3C_6F_{10}SO_3H$, $C_3F_7SO_3H$, $C_2F_5SO_3H$, $C_2HF_4SO_3H$, $C_3F_7CHFCF_2SO_3H$, $(CF_3)_2CHCF_2SO_3H$, $C_4F_7SO_3H$, $(CF_3)_2CF(CF_2)_4SO_3H$, $C_4F_9CFHCF_2SO_3H$, $C_3H_7CH(CF_3)CF_2SO_3H$, $C_{11}F_{23}SO_3H$, $C_5H_{11}CFHCF_2SO_3H$, $C_7F_{15}CFHCF_2SO_3H$, and the like, including mixtures thereof. Representative of the metal cations of such metal salts are those of the metals lithium, sodium, potassium, magnesium, calcium, strontium, barium, yitrium, vanadium, manganese, cobalt, nickel, copper, silver, zinc, cadmium, mercury, lead, bismuth, tungsten, lanthanum, neodymium, tin and gadolinium.

Other sulfonic acids and their derivatives can also be used to prepare the adducts of the present invention and include para-toluene sulfonic acid, dinonylnaphthylene sulfonic acid, alkyl sulfonic acids and the like.

The sulfonic acid metal salts used in this invention can be prepared by simply neutralizing the sulfonic acid precursors with a metal oxide, hydroxide, or carbonate or metal salt. The amino and ammonium salts can be formed by neutralization of the sulfonic acids with a salt-forming primary, secondary or tertiary amine, ammonia, or quaternary ammonium hydroxide. These latent forms of the sulfonic acid catalysts can be activated by heating them in the presence of the polycaprolactone polyol and polyepoxide to generate the sulfonic acid in this free acid form to make it available for catalyzing the reaction.

The sulfonic acid catalysts and derivatives thereof can be used in amounts varying from about 1 ppm to about 10,000 ppm or even greater (from about 0.0001 weight percent to about 1.0 weight percent based on the total charge of ingredients used in formulating the adduct compositions). The preferred concentration of sulfonic acid catalyst and derivatives thereof ranges from about 5 ppm to about 5000 ppm (from about 0.0005 weight percent to about 0.5 weight percent based on the total charge of ingredients used in formulating the adduct compositions). The most preferred concentration of sulfonic acid catalyst and derivatives thereof used in this invention ranges from about 50 ppm to about 4000 ppm (from about 0.005 weight percent to about 0.4 weight percent based on the total charge of ingredients used in formulating the adduct compositions).

The most preferred sulfonic acid catalysts and derivatives thereof useful in preparing the adduct compositions of the present invention include diethylammonium triflate, trifluoromethanesulfonic acid, ammonium triflate, di-isopropyl-ethyl ammonium triflate and di-isopropyl ammonium triflate. Some of these catalysts are commercially available from the 3M Company.

The adducts of this invention are prepared by reacting at least one polycaprolactone polyol and a polyepoxide in the presence of a sulfonic acid catalyst or derivative thereof at a temperature of from about 80° C. to about 225° C., preferably from about 100° C. to about 200° C., and most preferably from about 125° C. to about 190° C. The reaction proceeds satisfactorily at substantially atmospheric pressure under an inert atmosphere. However, elevated or subatmospheric pressures may be used. As is known to those skilled in the art, the time required to complete the reaction will depend on the catalyst concentration and the temperature of the reaction mixture. As exemplified in the present invention, the time can vary from one hour or less to about 6 hours depending on the conditions chosen. It is preferred to complete the reaction in as short a time as possible without using excessive amounts of catalyst. Preferably, the reaction is complete in about 5 hours or less and, most preferably, the reaction is complete in about 2 hours or less.

A preferred method for preparation of the adducts of this invention comprises adding one or more polycaprolactone polyols to a reactor, heating the polycaprolactone polyols to a temperature of about 100° C. and adding the sulfonic acid catalyst or derivative thereof using a nitrogen sparge as soon as the polycaprolactone polyols are molten. The polycarprolactone polyols and catalyst mixture is then heated to a temperature of from about 130° C. to about 200° C. and a polyepoxide is added to the mixture. An exotherm that increases the temperature about 10°–20° C. or more may be encountered under certain reaction conditions. It has been found that this exotherm is beneficial in driving the reaction to completion in a short time. The reaction is carried out for about one hour to about three hours or until the oxirane content has been reduced to almost a nil value. A modification of this process can involve initially adding all of the ingredients into the reactor. A further modification of this method can involve a vacuum treatment of from 10 to 30 minutes after the catalyst addition and/or the use of vacuum during the heating of the polycaprolactone polyols to a molten state.

It is believed that during the reaction of the mixture of polycaprolactone polyol(s) and polyepoxide(s) at least a major portion of the individual polycaprolactone polyol molecules react with only one epoxide group of the polyepoxide such that the equivalent of one hydroxyl group of the polyol reacts with a single epoxy group to open the oxirane ring to form a hydroxyl group on one of the oxirane carbon atoms, and an ether linkage with the second oxirane carbon atom and a carbon atom of the polyol. The following equation illustrates the reaction of two moles of a polycaprolactone triol with one mole of a cyclohexene diepoxide:

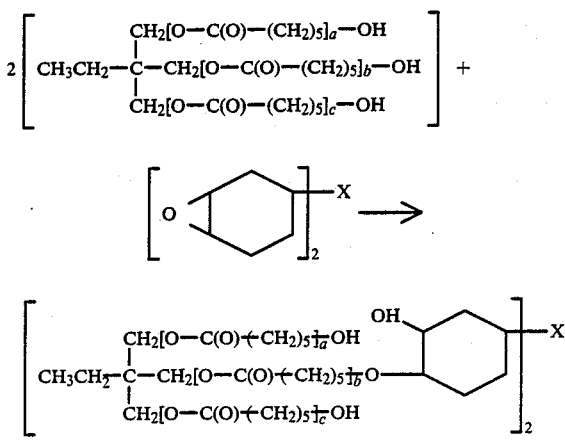

In the above equation, X is any of the divalent groups that links the two 3,4-epoxycyclohexyl nuclei such as —CH$_2$OOC—, —CH$_2$OOC(CH$_2$)$_4$COOCH$_2$— or —C(CH$_3$)$_2$—. The values of a, b and c may be any integers, including zero, such that the average molecular weight of the polycaprolactone polyol reactant shown is from about 200 to 6,000. It is to be understood that the structure of the product shown in the above equation is illustrative only and that any of the three hydroxyl groups of the caprolactone triol may react to open the oxirane groups of the polyepoxide reactant.

The above equation represents a theoretical norm. However, additional species of longer chain length can be present in the reaction product as a result of reactions of the hydroxyl groups of the product shown with unreacted oxirane groups during the reaction. Moreover, additional reaction mechanisms, such as the reaction of hydroxyl groups of unreacted polycaprolactone polyols with the ester linkage of the polyepoxide, may account for other long chain components in the reaction product. The presence of these long chain components can result in an increase in product viscosity, and it is desirable to minimize their formation.

With a highly efficient sulfonic acid catalyst or derivative thereof as used in the present invention which minimizes the time that unreacted, partially reacted and fully reacted polycaprolactone polyol and polyepoxide molecules are in contact with each other during the reaction period, shorter chain length products of low viscosity such as those illustrated in the above equation are favored. The longer the polycaprolactone polyol and polyepoxide reactants are in contact before the oxirane is consumed, the greater is the possibility of building high molecular weight adducts and having a high viscosity product. It is believed that the sulfonic acid catalyst and derivatives thereof used in the present invention reduce the oxirane content of the reaction mixture to a nil or extremely low value in a short period of time to give a predominance of shorter chain length products such as those illustrated in the above equation and therefore a low viscosity adduct.

A low oxirane content indicates that a major portion of the epoxide groups of the polyepoxide have reacted with a hydroxyl group of a polycaprolactone polyol to open the oxirane ring to form a hydroxyl group on one of the oxirane carbon atoms and an ether linkage with the second oxirane carbon atom and a carbon atom of the polycaprolactone polyol. Achieving such a low oxirane content in a short period of time is believed to give a predominance of shorter chain length, low viscosity, high functionality adducts such as those illustrated in the above equation. A high oxirane content indicates that a major portion of the epoxide groups of the polyepoxide have not reacted with a hydroxyl group of a polycaprolactone polyol.

The adducts of the present invention have an oxirane content of less than about 0.10 percent and a viscosity of less than about 3700 centistokes at 54.5° C., preferably an oxirane content of less than about 0.05 percent and a viscosity of less than about 3500 centistokes at 54.5° C., and most preferably an oxirane content of less than about 0.025 percent and a viscosity of less than about 3000 centistokes at 54.5° C. Many adducts exemplified in the present invention have an oxirane content of less than about 0.025 percent and a viscosity of less than about 1000 centistokes at 54.5° C. If desired, the reaction time can be increased so as to provide an essentially nil oxirane content.

The adducts of the present invention prepared from polyglycidyl epoxides can have an oxirane content of greater than about 0.10 percent and a viscosity of greater than about 3700 centistokes at 54.5° C. Such adducts preferably have an oxirane content of less than about 1.0 percent and a viscosity of less than about 25,000 centistokes at 54.5° C., more preferably an oxirane content of less than about 0.5 percent and a viscosity of less than about 15,000 centistokes at 54.5° C., and most preferably an oxirane content of less than about 0.25 percent and a viscosity of less than about 10,000 centistokes at 54.5° C.

The adducts of the present invention prepared from a single polycaprolactone polyol can have an oxirane content of greater than about 0.10 percent and a viscosity of greater than about 3700 centistokes at 54.5° C. Such adducts preferably have an oxirane content of less than about 0.50 percent and a viscosity of less than about 20,000 centistokes at 54.5° C., more preferably an oxirane content of less than about 0.25 percent and a viscosity of less than about 15,000 centistokes at 54.5° C., and most preferably an oxirane content of less than about 0.125 percent and a viscosity of less than about 10,000 centistokes at 54.5° C.

The novel adducts of the present invention are particularly useful in the formulation of high solids coating compositions. Such curable coating compositions preferably comprise an adduct of a polycaprolactone polyol and a polyepoxide of the present invention, a polyepoxide containing two or more epoxy groups per molecule, and a catalyst or photoinitiator. Other additives such as surfactants, solvents, substituted cycloaliphatic monoepoxide reactive diluents and the like can also be included in the curable high solids coating compositions as more fully described below.

Any of the adducts of a polycaprolactone polyol and a polyepoxide of the present invention are useful in formulating the curable high solids coating compositions. The concentration of the adduct in the curable high solids coating compositions can range from about 1 to about 60 weight percent, preferably from 5 to 40 weight percent and most preferably from 10 to 30 weight percent of the total weight of the coating composition depending upon the desired properties in the cured compositions.

The preferred polyepoxides containing two or more epoxy groups per molecule which are suitable for reacting with the adducts of the present invention are any of the polyepoxides described hereinabove which are useful in preparing the adduct compositions per se. However, other reactive materials such as polyisocyanates and amino-formaldehyde resins selected from melamine formaldehyde resins, urea formaldehyde resins and benzoguanamine formaldehyde resins can also be reacted with the adducts prepared in accordance with the process of the present invention to give polyurethane coating compositions and amino-formaldehyde resin coating compositions respectively. The polyisocyanates and amino-formaldehyde resins are well known in the art and no further description is necessary to enable one skilled in the art to know what they are. The concentration of the polyepoxide or polyisocyanate or amino-formaldehyde resin in the curable high solids coating compositions can range from about 1 to about 95 weight percent, preferably from 25 to 90 weight percent and most preferably from 50 to 80 weight percent of the total weight of the coating composition depending upon the desired properties in the cured composition.

Suitable catalysts which can be employed in the curable high solids coating compositions to effect curing thereof preferably include any of the sulfonic acid catalysts or derivatives thereof described hereinabove which are useful in preparing the adduct compositions per se. The concentration of the catalyst in the curable high solids coating compositions can range from about 0.1 to 30 parts by weight per 100 parts by weight of the combination of the polyepoxide and the adduct composition.

For photocopolymerizable coating compositions, a photoinitiator can be employed in place of the above catalyst. The photoinitiator suitable for use in the curable coating compositions may be any one of the well known photoinitiators such as described in, for example, U.S. Pat. Nos. 4,231,951; 4,256,828; 4,138,255 and 4,058,401, which patents are incorporated herein by reference. Preferred photoinitiators alone or in admixture include triarylsulfonium complex salts as described in U.S. Pat. No. 4,231,951, aromatic sulfonium or iodonium salts of halogen-containing complex ions as described in U.S. Pat. No. 4,256,828; aromatic onium salts of Group VIa elements as described in U.S. Pat. Nos. 4,058,401 and 4,138,255; aromatic onium salts of Group Va elements as described in U.S. Pat. No. 4,069,055. Such salts are commercially available as FC-508 and FC-509 (available from Minnesota Mining and Manufacturing Company), and as UVE-1014 (available from General Electric Company). The photoinitiators are used in conventional amounts such as from about 0.1 to 30 parts by weight per 100 parts by weight of the combination of polyepoxide and the adduct composition.

The curable coating compositions may preferably include additives in conventional quantities such as oils, particularly silicone oil, surfactants such as silicone-alkylene oxide copolymers, e.g., L-5410 commercially available from Union Carbide Corporation, silicone oil containing aliphatic epoxide groups, fluorocarbon surfactants such as FC-171 commercially available from the 3M Company and FC-430 also commercially available from the 3M Company; low molecular weight alcohols such as ethanol, propanol, butanol, hexanol and the like; hydroxyl-containing copolymers of ethylenically unsaturated monomers such as RJ-100 commercially available from Monsanto Chemical Company; cellosolves, such as butyl CELLOSOLVE commercially available from Union Carbide Corporation; carbitols, such as butyl CARBITOL; diethyleneglycol; low molecular weight hydroxyl-containing vinyl polymers such as UCAR Solution Vinyl VYES commercially available from Union Carbide Corporation; glycidyl ether monomers of the formula:

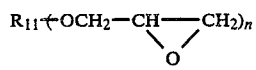

wherein $R_{11}$ is alkyl or aryl and n is an integer of 1 to 6. Examples are glycidyl ethers of polyhydric phenols obtained by reacting a polyhydric phenol with an excess of chlorohydrin such as epichlorohydrin. Further examples of this type are described in, for example, U.S. Pat. No. 3,018,262; alpha olefin epoxides; epoxy novolaks, and the like. If desired, one may also include in the coating compositions various conventional non-basic fillers (e.g., silica, talc, glass beads or bubbles, clays, powdered metal such as aluminum, zinc oxide, etc.) up to about 50% by volume or more, viscosity modifiers, rubbers, tackifying agents, pigments, and so forth. The particular additives or fillers selected are of no consequence to the basic invention.

In addition, the curable coating compositions can be combined with various structural fibers and cured to form useful high-strength composite materials. The structural fibers which are useful with the curable coating compositons include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. duPont de Nemours, Inc., Wilmington, DE), and silicon carbide fibers.

The curable coating compositions may preferably include a substituted cycloaliphatic monoepoxide reactive diluent. The substituted cycloaliphatic monoepoxide used in the coating compositions is substituted with alkyl of 1 to 9 carbon atoms, halogen, oxygen, ether, ester or vinyl radicals. Preferably, the substituted cycloaliphatic monoepoxide is vinyl substituted cycloaliphatic monoepoxide and is preferably selected from one or more of the following;

(1) 4-vinyl cyclohexene monoepoxide having the formula

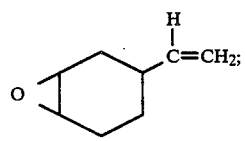

(2) norbornene monoepoxide having the formula

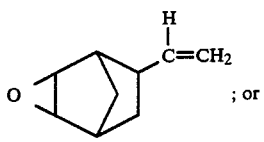

; or (3) limonene monoepoxide having the formula

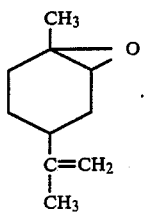

The substituted cycloaliphatic monoepoxide acts as a reactive diluent that cures into the final coating product, a marked effect in lowering viscosity, is not volatilized during the cure operation, does not retard the curing rate.

The substituted cycloaliphatic monoepoxide is used in the curable coating compositions in amounts of from about 0.1 to about 95, preferably from about 1 to about 60, and most preferably, from about 3 to about 30 weight percent.

In preparing the coating compositions, the ingredients are mixed by conventional procedures used in the production of inks, paints and coating compositions. These procedures are so well known to those skilled in the art that they do not require further discussion here. However, it should be noted that when a photoinitiator is incorporated into the coating compositions, it is necessary that the curable coating formulation be mixed or blended under "safe light" such as a yellow light source to obviate or minimize photocopolymerization. The coating compositions can also contain an organic solvent as an optional component. Any of the conventional solvents used in the coatings industry can be used at a concentration preferably below 30 weight percent of the total weight of the coating composition. Suitable solvents are acetone, methylene chloride and any solvent that does not react appreciably with the coating ingredients. While larger amounts of solvent could conceivably be used, the use of larger amounts would negate the benefits of high solids curable coatings which are considered to be essentially 100% solids coating systems. The solvents are generally added in the small amounts indicated to improve flowability during application of the coating composition to the substrate.

The curable coating compositions are applied as wet films to a suitable surface or substrate by conventional means such as roll coating or spray. Curing of the curable coating compositions can be effected by heating the wet films at a temperature of from about 100° C. to about 200° C. for a period of time of from about 1 minute to about 2 hours or longer. Curing can also be effected by photopolymerization of the coating compositions which occurs on exposure of the compositions to any source of radiation emitting actinic radiation at a wavelength within the ultraviolet and visible spectral regions. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiators being utilized and depending upon the radiation source and distance from the source and the thickness of the coating to be cured. The compositions may also be polymerized by exposure to electron beam irradiation. Generally speaking the dosage necessary is from less than 1 megarad to 100 megarad or more. Generally speaking the rate of polymerization increases with increasing amounts of photoinitiator at a given light exposure or irradiation. The rate of polymerization also increases with increasing light intensity or electron dosage.

The curing or photopolymerization of the coating compositions is a triggered reaction. Once the degradation of the photointiator to a cationic catalyst has begun by exposure to a radiation source, the curing or photopolymerization reaction proceeds and will continue after the radiation source is removed. The use of thermal energy during or after exposure to a radiation source, i.e., post cure thermally, will generally accelerate the curing reaction, and even a moderate increase in temperature may greatly accelerate cure rate.

The cured coating compositions can be useful as automotive finishes, can finishes, appliance finishes, business machine finishes, coil coating, house siding finishes, general metal finishes and the like. The compositions can also be used as adhesives, printing inks, casting and molding compounds, potting and encapsulating compounds, caulking and sealing compounds, impregnating and coating compounds and the like. The photocopolymerizable compositions are particularly suitable in a variety of applications in the fields of protective coatings and graphic arts due to their excellent impact resistance and abrasion-resistance and adhesion to rigid, resilient and flexible substrates such as metal, plastic, rubber, glass, paper, wood, and ceramics.

The low viscosity adducts of a polycaprolactone polyol and a polyepoxide prepared in the examples below were evaluated according to the following procedures:

Oxirane Content: Tetraethylammonium bromide reagent was prepared by dissolving 350 grams of 99 percent tetraethylammonium bromide in a mixture of 1400 milliliters of c.p. acetic acid and 1800 milliliters of reagent grade chlorobenzene and then adding 1.0 milliliter of 1 percent crystal violet indicator in acetic acid. The reagent was mixed well and neutralized to a blue-green color. Anhydrous standard 0.1N perchloric acid in acetic acid was prepared by dissolving 30 milliliters of 70-72 percent perchloric acid in approximately 2000 milliliters of c.p. acetic acid, and then adding 100 milliliters of acetic anhydride and diluting to 3500 milliliters with c.p. acetic acid. Standardization was against 0.7-0.8 grams of potassium acid phthalate dissolved in 50 milliliters of acetic acid using crystal violet indicator. Using a graduated cylinder, 100 milliliters of the tetraethylammonium bromide reagent was added to each of two 250 milliliter wide-mouth Erlenmeyer flasks. About 0.7 to 0.8 grams of the adduct product, weighed to the nearest milligram, were added to each flask and mixed well. The contents in the flasks were titrated immediately with the anhydrous standard 0.1N perchloric acid in acetic acid to a blue-green color end point stable for 2 minutes and the percent oxirane was calculated as follows:

$$\frac{(A)(N)(1.6)}{\text{grams sample}} = \text{percent by weight oxirane}$$

where A is the milliliters of anhydrous standard perchloric acid in acetic acid titration solution and N is the normality of the anhydrous standard perchloric acid in acetic acid.

Viscosity (centistokes): determined at the specified temperature by means of a calibrated capillary-type viscometer having the required centistoke range.

Viscosity (centipoise): determined with a Brookfield viscometer at ambient temperature.

Hydroxyl Number: Phthalic anhydride-imidazole-pryidine reagent was prepared by weighing 111-116 grams of c.p. phthalic anhydride into a one-quart brown bottle and then adding 700 milliliters of pyridine which had been distilled over phthalic anhydride. The contents in the bottle were mixed vigorously to effect complete solution and 16-18 grams of c.p. imidazole were added and swirled carefully to dissolve. Into heat-resistant pressure bottles was pipeted 25 milliliters of the phthalic anhydride-imidazole-pyridine reagent and, by means of a hypodermic syringe or other suitable equipment, a calculated amount of adduct product, weighed to the nearest 0.1 milligram, was added to some of the bottles (some bottles reserved for blank determination). The bottles were capped and swirled until the sample was completely dissolved in the reagent. Each bottle was then placed in a water bath maintained at 98° C.±2° C. for 30 minutes, and thereafter allowed to cool to ambient temperature. To each bottle was added 50 milliliters of redistilled pyridine and, after 2 minutes, approximately 0.5 milliliters of a 1.0 percent solution of phenolphthalein in pyridine. The contents in the bottles were titrated with standard 0.5N sodium hydroxide to a pink color end point stable for at least 15 seconds and the hydroxyl number was calculated as follows:

$$\frac{(B-A)(N)(56.1)}{\text{grams sample}} = \text{Hydroxyl No. (mg KOH/gram sample)}$$

where A is the milliliters of standard sodium hydroxide titration solution required for the sample, B is the milliliters of standard sodium hydroxide titration solution required for the blank sample, and N is the normality of the sodium hydroxide.

Acid Number: A solution was prepared containing 1200 milliliters of isopropanol, 200 milliliters of water and 150 milliliters of methylene chloride. Into a 250 milliliter Erlenmeyer flask was added 50 milliliters of the above solution and a 10 gram sample of adduct product, weighed to the nearest 0.1 milligram. The contents were swirled to effect complete solution, and 1.0-1.5 milliliters of a 1.0 percent solution of phenolphthalein in methanol was added and swirled into solution. The contents in the flask were titrated with 0.02N potassium hydroxide in alcohol to a pink color end point for small acid number values and with 0.1N potassium hydroxide in alcohol for high acid number values. The acid number was calculated as follows:

$$\frac{(A)(N)(56.1)}{\text{grams sample}} = \text{Acid No. (mg. KOH/gram sample)}$$

where A is the milliliters of potassium hydroxide titration solution required for the sample and N is the normality of the potassium hydroxide in alcohol.

Water Content: a determination of any concentration of water in the adduct product by titration with a sulfur dioxide-iodine reagent as more fully described in Union Carbide Corporation Laboratory Manual Specification Method 31-29W1-4 (Mar. 2, 1955).

Color, Gardner Scale: a measurement of the color of transparent liquid adduct product solutions as described in ASTM D 1544-68 (Reapproved 1974).

The coating compositions prepared in the examples below were evaluated according to the following procedures:

Solvent Resistance (Double Acetone Rubs): a measure of the resistance of the cured film to attack by acetone in which a film coating surface was rubbed with an acetone soaked cheesecloth back and forth with hand pressure. A rub back and forth with hand pressure over the film coating surface with the acetone soaked cheesecloth was designated as one "double acetone rub". The effect that a certain number of double acetone rubs had on the film coating surface was reported by a number in parenthesis following the number of double acetone rubs. The rating system for evaluating acetone resistance for a given number of double acetone rubs was as follows:

Number in Parenthesis After Number of Rubs (1) No change in coating appearance.
(2) Scratched surface.
(3) Dulled, marred, some coating removed.
(4) Breaks in coating appearance.
(5) About one-half of the coating removed.

Pencil Hardness: pencil leads of increasing hardness values were forced against the film coating surface in a precisely defined manner as described in ASTM-D-3363-74 until one pencil lead marred the surface of the film coating. The surface hardness was considered as the hardest pencil grade which just failed to mar the film coating surface. The pencil leads in order of softest to hardest were reported as follows: 6B, 5B, 4B, 3B, 2B, B, HB, F, H, 2H, 3H, 4H, 5H, 6H, 7H, 8H, and 9H.

Crosshatch Adhesion: a lattice pattern with ten cuts in each direction was made in the coating film to the substrate and pressure-sensitive adhesive tape was applied over the lattice pattern and then removed. The adhesion was evaluated by comparison with descriptions and illustrations as more fully detailed in ASTM-D-3359-78.

Forward Impact Resistance (Gardner Impact): a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the coated side of the coated steel panel. The inches times pounds, designated inch-pounds, absorbed by the film without rupturing was recorded as the films forward impact resistance.

Reverse Impact Resistance (Gardner Impact): a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the films reverse impact resistance.

Water Immersion Resistance: the cured film coating was immersed in water for a specified period of time and at a specified temperature. After removal from the water, the hydrolytic resistance of the cured film coating was determined by the pencil hardness test and the crosshatch adhesion test described hereinabove. Results obtained were compared with the results of identical tests performed on cured film coatings not immersed in water to determine moisture resistance.

The following examples are illustrative of the present invention and are not intended as a limitation upon the scope thereof. As used in the examples appearing hereinafter, the following designation, terms and abbreviations have the indicated meanings:

| | |
|---|---|
| mg. | milligram |
| °C. | Centigrade degree |
| °F. | Fahrenheit degree |
| cc | cubic centimeter |
| Epoxide I | 3,4-Epoxycyclohexylmethyl-3,4-epoxycyclohexane carboxylate commercially available from Union Carbide Corporation as ERL-4221. |
| Epoxide II | Bis(3,4-epoxycyclohexylmethyl)adipate commercially available from Union Carbide Corporation as ERL-4299. |
| Epoxide III | Vinylcyclohexane diepoxide commercially available from Union Carbide Corporation as ERL-4206. |
| Epoxide IV | A diglycidyl ether of Bisphenol A having an equivalent weight of 185–192 and commercially available from Shell Chemical Company as EPON-828. |
| Epoxide V | 4-Vinylcyclohexene monoepoxide. |
| Epoxide VI | Limonene monoepoxide commercially available from Viking Chemical Company. |
| Melamine I | A modified melamine resin in 20 weight percent isobutanol and commercially available from American Cyanamid Company as Cymel 325. |
| Polyol I | A polycaprolactone diol having an average molecular weight of 530, an average hydroxyl number of 212 and commercially available from Union Carbide Corporation as TONE-0200. |
| Polyol II | A polycaprolactone diol having an average molecular weight of 830, an average hydroxyl number of 135 and commercially available from Union Carbide Corporation as TONE-0210. |
| Polyol III | A polycaprolactone triol having an average molecular weight of 540, an average hydroxyl number of 310 and commercially available from Union Carbide Corporation as TONE-0305. |
| Polyol IV | A polycaprolactone triol having an average molecular weight of 300, an average hydroxyl number of 560, and commercially available from Union Carbide Corporation as TONE-0301. |
| Polyol V | A polycaprolactone triol having an average molecular weight of 900, an average hydroxyl number of 187 and commercially available from Union Carbide Corporation as TONE-0310. |
| Polyol VI | A dihydroxy functional polyol prepared by reacting 63 mole percent caprolactone, 19 mole percent diethylene glycol and 18 mole percent adipic acid at an elevated temperature; having an average molecular weight of 3,066, an average hydroxyl number of 36.6 and commercially available from Union Carbide Corporation as D-737. |
| Catalyst I | An aqueous solution of 60 weight percent diethylammonium triflate and 40 weight percent of a 50/50 mixture of water and butyl CARBITOL and commercially available from the 3M Company as FC-520. |
| Catalyst II | An aqueous solution containing 60 weight percent of trifluoromethanesulfonic acid (triflic acid) and commercially available from the 3M Company as FC-24 Aq. |
| Catalyst III | Stannous octoate. |
| Catalyst IV | A catalyst material in 60 weight percent isopropanol having an acid number of 130–140 and a specific gravity of 0.960 and commercially available from American Cyanamid Company as Cycat 4040. |
| Photoinitiator I | A solution of a triarylsulfonium hexafluorophosphate having a specific gravity of 1.33 at 23° C., and a Brookfield viscosity of 40,000–60,000 centipoise (#4 spindle at 6 rpm, 23° C.) and commercially available from the 3M Company as FC-508. |
| Photoinitiator II | A solution of a triarylsulfonium hexafluoroantimony salt having a specific gravity of 1.39, a Brookfield viscosity of 74 centipoise at 25° C. and commercially available from General Electric company as UVE-1014. |
| Surfactant I | A silicone composition having the following structure: |

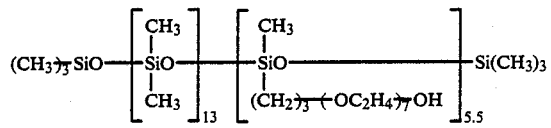

| | |
|---|---|
| | and commercially available from Union Carbide Corporation as L-5410. |
| Solvent I | Methyl isobutyl ketone. |
| Polyol Adduct I | The product prepared in Example 2 containing tetrafunctional polyol adduct and having the properties described in Example 2. |
| Polyol Adduct II | The product prepared in Example 13 containing hexafunctional polyol adduct and having the properties described in Example 13. |
| Polyol Adduct III | The product prepared in Example 15 containing hexafunctional polyol adduct and having the properties described in Example 15. |

| | |
|---|---|
| Polyol Adduct IV | The product prepared in Example 17 containing hexafunctional polyol adduct and having the properties described in Example 17. |
| Polyol Adduct V | The product prepared in Example 20 containing a mixture of hexafunctional polyol adduct, pentafunctional polyol adduct and tetrafunctional polyol adduct and having the properties described in Example 20. |

COMPARATIVE EXAMPLE A

Into a 100 gallon glass-lined autoclave (G101) previously cleaned with refluxing acetone and dried with nitrogen was added 617.4 pounds of Polyol IV and 282.6 pounds of Epoxide I (a 2/1 mole ratio). The contents in the autoclave were mixed for 15 minutes at ambient temperature, after which 61 grams of Catalyst III were added to the autoclave and the autoclave contents were then mixed for 1 hour at ambient temperature. Mixing was accomplished by alternate two-blade and three-blade Glascote impellers, a total of four sets on a single off-center shaft operated at 114 rpm. The contents in the autoclave were then heated to a temperature of 170° C. with continuous mixing and maintained at this temperature for 27 hours. The reaction temperature was controlled by circulating tempered ethylene glycol through the autoclave jacket and high-purity nitrogen was used to exclude air and/or moisture from the autoclave. Samples were taken at intervals and analyzed for percent oxirane content and viscosity. After 3 hours into the total 27 hour heating period, the oxirane content was measured as 2.07 percent and the viscosity at 130° C. was 14.097 centistokes. After 5 hours into the total 27 hour heating period, the oxirane content was measured as 1.47 percent and the viscosity at 130° F. was 16,735 centistokes. After 7 hours into the total 27 hour heating period, the oxirane content was measured as 1.16 percent and the viscosity at 130° F. was 18,340 centistokes. After 10 hours into the total 27 hour heating period, the oxirane content was measured as 0.93 percent and the viscosity at 130° F. was 19,956 centistokes. After 14.5 hours into the total 27 hour heating period, the oxirane content was measured at 0.73 percent and the viscosity at 130° F. was 20,792 centistokes. At the end of the 27 hour heating period, the oxirane content was measured as 0.51 percent and the viscosity at 130° F. was 21,850 centistokes. After cooling to a temperature of 80° C., the contents in the autoclave were then collected as a residue product and, upon analysis, the residue product was found to have the following properties:

Oxirane Content: 0.51 percent
Viscosity at 130° F.: 21,850 centistokes
Hydroxyl No.: 399 mg. KOH/gram
Color, Gardner Scale: ~1

Comparative Example A illustrates the high viscosity product that is obtained when the art described in U.S. Pat. No. 3,896,303 is practiced.

COMPARATIVE EXAMPLE B

Into a 2 liter four-necked round bottom reaction flask equipped with a nitrogen inlet and outlet port, mechanical stirrer, heating mantle and thermometer was added 450 grams (1.5 moles) of Polyol IV, 540 grams (1.0 mole) of Polyol III, and 274 grams (1.0 mole) of Epoxide I (a mole ratio of 1.5:1:1 respectively). The contents in the reaction flask were heated to a temperature of 100° C. with continuous stirring after which 0.19 grams (0.015 weight percent based on total charge) of Catalyst III were added to the reaction flask. The contents in the reaction flask were then heated to a temperature of 150° C. with continuous stirring and maintained at this temperature for 6.5 hours. A nitrogen blanket was maintained throughout this reaction period. Samples were taken at intervals and analyzed for percent oxirane content. After 2 hours into the total 6.5 hour heating period, the oxirane content was measured as 1.94 percent. After 3 hours into the total 6.5 hour heating period, the oxirane content was measured as 0.63 percent. After 5 hours into the total 6.5 hour heating period, the oxirane content was measured as 0.18 percent. At the end of the 6.5 hour heating period, the oxirane content was measured as 0.106 percent. After cooling to a temperature of 50° C., the contents in the reaction flask were then collected as a residue product (yellow liquid) and, upon analysis, the residue product was found to have the following properties:

Oxirane Content: 0.106 percent
Viscosity at 54.5° C.: 3790 centistokes
Hydroxyl No.: 333 mg. KOH/gram
Color, Gardner Scale: ~3.5

Comparative Example B illustrates the product that is obtained when the art described in U.S. Pat. No. 4,045,474 is practiced (see Example 2 therein). A comparison with Example 14 of the present invention reveals that the product of Example 14 was made in a much shorter time and had a significantly lower viscosity and oxirane content than the product of Comparative Example B.

COMPARATIVE EXAMPLE C

Into a 100 gallon glass-lined autoclave (G101) previously cleaned with refluxing acetone and dried with nitrogen was added 320 pounds of Polyol IV, 385 pounds of Polyol III and 195 pounds of Epoxide I (a mole ratio of 1.5:1:1 respectively). The contents in the autoclave were heated to a temperature of 110° C. with continuous mixing, after which 61.3 grams of Catalyst III were added to the autoclave. Mixing was accomplished by a 15 inch three-blade Glascote impeller operated at 114 rpm. The contents in the autoclave were then heated to a temperature of 150° C. with continuous mixing and maintained at this temperature for 22.5 hours. The reaction temperature was controlled by circulating tempered ethylene glycol through the autoclave jacket and a slight air purge was maintained throughout the reaction. After 7.25 hours into the total 22.5 hour heating period, an additional 61.3 grams of Catalyst III were added to the autoclave. The oxirane content was monitored during the remaining reaction period (15.25 hours) to ascertain the decrease in epoxide content and the extent of the reaction. At the end of the 22.5 hour heating period, the oxirane content was measured as 0.30 percent. After cooling to a temperature of 80° C., the contents in the autoclave were then collected as a filtered product and, upon analysis, the filtered product was found to have the following properties:

Oxirane Content: 0.30 percent
Viscosity at 54.5° C.: 3250 centipoise

Hydroxyl No.: 345 mg. KOH/gram
Color, Gardner Scale: 2.5
Water Content: 0.02 percent Comparative Example C illustrates the product that is obtained when the art described in U.S. Pat. No. 4,045,474 is practiced. A long reaction time is required to attain a low final oxirane content.

COMPARATIVE EXAMPLE D

Into a 2 liter four-necked round bottom reaction flask equipped with a nitrogen inlet and outlet port, mechanical stirrer, heating mantle and thermometer was added 450 grams (1.5 moles) of Polyol IV, 540 grams (1.0 mole) of Polyol III, and 274 grams (1.0 mole of Epoxide I (a mole ratio of 1.5:1:1 respectively). The contents in the reaction flask were heated to a temperature of 100° C. with continuous stirring after which 0.19 grams (0.015 weight percent based on total charge) of Catalyst III were added to the reaction flask. The contents in the reaction flask were then heated to a temperature of 150° C. with continuous stirring and maintained at this temperature for 13 hours. A nitrogen blanket was maintained throughout this reaction period. Samples were taken at intervals and analyzed for percent oxirane content. After 7 hours into the total 13 hour heating period, the oxirane content was measured as 1.36 percent. After 10 hours into the total 13 hour heating period, the oxirane content was measured at 0.30 percent. After 12 hours into the total 13 hour heating period, the oxirane content was measured as 0.16 percent. At the end of the 13 hour heating period, the oxirane content was measured as 0.12 percent. After cooling to a temperature of 50° C., the contents in the reaction flask were then collected as a residue product and, upon analysis, the residue product was found to have the following properties:

Oxirane Content: 0.12 percent
Viscosity at 54.5° C.: 3713 centistokes
Hydroxyl No.: 338 mg. KOH/gram Comparative Example D illustrates the product that is obtained when the art described in U.S. Pat. No. 4,045,474 is practiced (see Example 2 therein). A comparison with Example 14 of the present invention reveals that the product of Example 14 was made in a much shorter time and had a significantly lower viscosity and oxirane content than the product of Comparative Example D.

COMPARATIVE EXAMPLE E

Into a 5 liter four-necked round bottom reaction flask equipped with a nitrogen inlet and outlet port, mechanical stirrer, heating mantle and thermometer was added 2444 grams (8.15 moles) of Polyol IV and 744 grams (2.72 moles) of Epoxide I (a mole ratio of 3:1). The contents in the reaction flask were heated to a temperature of 100° C. with continuous stirring after which 0.239 grams (0.0075 weight percent based on total charge) of Catalyst III were added to the reaction flask. The contents in the reaction flask were then heated to a temperature of 150° C. with continuous stirring and maintained at this temperature for 148.75 hours. A nitrogen blanket was maintained throughout this reaction period. When the temperature reached 150° C., an additional 0.239 grams (0.0075 weight percent based on total charge) of Catalyst III were added to the reaction flask. Samples were taken at intervals and analyzed for percent oxirane content and viscosity. After 21.5 hours into the total 148.75 hour heating period, the oxirane content was measured as 1.97 percent and the viscosity at 54.5° C. was 792 centistokes. After 38.75 hours into the total 148.75 hour heating period, the oxirane content was measured as 1.29 percent and the viscosity at 54.5° C. was 1652 centistokes. After 46.25 hours into the total 148.75 hour heating period, the oxirane content was measured as 1.18 percent and the viscosity at 54.5° C. was 2667 centistokes. After 90.25 hours into the total 148.75 hour heating period, the oxirane content was measured as 0.58 percent and the viscosity at 54.5° C. was 9560 centistokes. After 136.25 hours into the total 148.75 hour heating period, the oxirane content was measured as 0.12 percent and the viscosity at 54.5° C. was 26,176 centistokes. At the end of the 148.75 hour heating period, the oxirane content was measured as 0.06 percent and the viscosity at 54.5° C. was 31,848 centistokes. After cooling to a temperature of 50° C., the contents in the reaction flask were then collected as a residue product and, upon analysis, the residue product was found to have the following properties:

Oxirane Content: 0.06 percent
Viscosity at 54.5° C.: 31,848 centistokes
Hydroxyl No.: 314 mg. KOH/gram
Color, Gardner Scale: 5.0

Comparative Example E illustrates the product that is obtained when the comparative art described in U.S. Pat. No. 4,045,474 is practiced (See Control 3 therein).

EXAMPLE 1

Into a 2 liter four-necked round bottom reaction flask equipped with a nitrogen inlet and outlet port, mechanical stirrer, heating mantle and thermometer was added 1,325 grams (2.5 moles) of melted Polyol I. The polyol was heated to a temperature of 140° C. with continuous stirring and sparging with nitrogen, after which 274 grams (1.0 mole) of Epoxide I and 0.63 grams (0.04 weight percent based on total charge) of Catalyst I were added to the reaction flask. The contents in the reaction flask were maintained at a temperature of 140°–145° C. for a period of 3 hours with continuous stirring. A nitrogen blanket was maintained throughout this reaction period (nitrogen sparge removed). Samples were taken at intervals and analyzed for percent oxirane content. After 2 hours into the total 3 hour heating period, the oxirane content was measured as 0.04 percent. At the end of the 3 hour heating period, the oxirane content was measured as 0.03 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

Oxirane Content: 0.03 percent
Viscosity at 54.5° C.: 531 centistokes
Hydroxyl No.: 156.9 mg. KOH/gram
Acid No.: 0.22 mg. KOH/gram

EXAMPLE 2

Into a 2 liter four-necked round bottom reaction flask equipped with a nitrogen inlet and outlet port, mechanical stirrer, heating mantle and thermometer was added 2,075 grams (2.5 moles) of Polyol II. The polyl was heated to a temperature of 140° C. with continuous stirring and sparging with nitrogen, after which 274 grams (1.0 mole) of Epoxide I and 0.63 grams (0.027 weight percent based on total charge) of Catalyst I were added to the reaction flask. The contents in the reaction flask were maintained at a temperature of 140° C.–150° C. for a period of 5 hours with continuous stirring. A nitrogen blanket was maintained throughout this reaction period (nitrogen sparge removed). Samples were taken at intervals and analyzed for percent oxirane content. After 1 hour into the total 5 hour heating period at a temperature of 140° C. the oxirane content was measured as 1.03 percent. After 2.5 hours into the total 5 hour heating period at a temperature of 150° C., the oxirane content was measured as 0.08 percent. After 4.0 hours into the total 5 hour heating period at a temperature of 145° C., the oxirane content was measured as 0.02 percent. At the end of the 5 hour heating period, the oxirane content was measured as 0.01 percent and the reaction was terminated. After cooling to ambient temperature, the contents in the reaction flask were then collected as a residue product (soft off-white solid) and, upon analysis, the residue product containing principally on the average a mixture of a tetrafunctional polyol adduct and unreacted difunctional polyol was found to have the following properties:

Oxirane Content: 0.01 percent (nil)
Viscosity at 54.5° C.: 931 centistokes
Hydroxyl No.: 114 mg. KOH/gram
Acid No.: 0.23 mg. KOH/gram
Water Content: 0.08 percent

EXAMPLE 3

Into a 2 liter four-necked round bottom reaction flask equipped with a nitrogen inlet and outlet port, mechanical stirrer, heating mantle and thermometer was added 2775 grams (9.25 moles) of Polyol IV. The polyol was heated to a temperature of 100° C. with continuous stirring and sparging with nitrogen, after which 1.89 grams (0.05 weight percent based on total charge) of Catalyst I were added to the reaction flask. The contents in the reaction flask were then vacuum stripped for 10 minutes at 100° C. to remove any volatiles such as water in Catalyst I. After removal of the vacuum, a nitrogen sparge was again employed while the contents in the reaction flask were heated to 140° C. with continuous stirring. At a temperature of 140° C., 1014 grams (3.70 moles) of Epoxide I were added into the reaction flask. The contents in the reaction flask were maintained at a temperature of 140° C.–170° C. for a period of 2 hours with continuous stirring. A nitrogen blanket was maintained throughout this reaction period (nitrogen sparge removed). Samples were taken at intervals and analyzed for percent oxirane content. At the end of the 2 hour heating period, the oxirane content was measured as 0.036 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.036 percent
Viscosity at 54.5° C.: 5423 centistokes
Hydroxyl No.: 413 mg. KOH/gram
Acid No.: 0.36 mg. KOH/gram
Water Content: 0.00 percent

EXAMPLE 4

Into a 2 liter four-necked round bottom reaction flask equipped with a nitrogen inlet and outlet port, mechanical stirrer, heating mantle and thermometer was added 2775 grams (9.25 moles) of Polyol IV. The polyol was heated to a temperature of 100° C. with continuous stirring and sparging with nitrogen, after which 1.89 grams (0.05 weight percent based on total charge) of Catalyst I were added to the reaction flask. The contents in the reaction flask were heated to a temperature of 140° C. with continuous stirring, after which 1014 grams (3.7 moles) of Epoxide I were added into the reaction flask. The contents in the reaction flask were maintained at a temperature of 165° C. for a period of 3.5 hours with continuous stirring. A nitrogen blanket was maintained throughout this reaction period (nitrogen sparge removed). Samples were taken at intervals and analyzed for percent oxirane content. At the end of the 3.5 hour heating period, the oxirane content was measured as 0.04 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.04 percent
Viscosity at 54.5° C.: 5488 centistokes
Hydroxyl No.: 371 mg. KOH/gram
Acid No.: 0.26 mg. KOH/gram
Water Content: 0.00 percent

EXAMPLE 5

Into a 2 liter four-necked round bottom reaction flask equipped with a nitrogen inlet and outlet port, mechanical stirrer, heating mantle and thermometer was added 335.4 grams (1.118 moles) of Polyol III. The polyol was heated to a temperature of 100° C. with continuous stirring and sparging with nitrogen, after which 0.375 grams (0.075 weight percent based on total charge) of Catalyst I were added to the reaction flask. The contents in the reaction flask were heated to a temperature of 140° C. with continuous stirring, after which 164.6 grams (0.447 moles) of Epoxide II were added to the reaction flask. The contents in the reaction flask were maintained at a temperature of 160° C.–170° C. for a period of 1 hour with continuous stirring. A nitrogen blanket was maintained throughout this reaction period (nitrogen sparge removed). Samples were taken at intervals and analyzed for percent oxirane content. At the end of the 1 hour heating period, the oxirane content was measured as 0.01 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.01 percent
Viscosity at 54.5° C.: 3244 centistokes
Hydroxyl No.: 383 mg. KOH/gram
Acid No.: 0.34 mg. KOH/gram
Water Content: 0.00 percent

EXAMPLE 6

Into a 2 liter four-necked round bottom reaction flask equipped with a nitrogen inlet and outlet port, mechanical stirrer, heating mantle and thermometer was added 420.0 grams (1.40 moles) of Polyol III. The polyol was heated to a temperature of 100° C. with continuous stirring and sparging with nitrogen, after which 0.374 grams (0.075 weight percent based on total charge) of Catalyst I were added to the reaction flask. The contents in the reaction flask were heated to a temperature of 140° C. with continuous stirring, after which 78.4 grams (0.56 moles) of Epoxide III were added into the reaction flask. The contents in the reaction flask were maintained at a temperature of 160° C.-170° C. for a period of 1 hour with continuous stirring. A nitrogen blanket was maintained throughout this reaction period (nitrogen sparge removed). Samples were taken at intervals and analyzed for percent oxirane content. At the end of the 1 hour heating period, the oxirane content was measured as 0.04 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.04 percent
Viscosity at 54.5° C.: 1162 centistokes
Hydroxyl No.: 457 mg. KOH/gram
Acid No.: 0.23 mg. KOH/gram
Water Content: 0.00 percent

EXAMPLE 7

Into a one liter four-necked round bottom reaction flask equipped with a nitrogen inlet and outlet port, mechanical stirrer, heating mantle and thermometer was added 420 grams (1.40 moles) of Polyol IV. The polyol was heated to a temperature of 100° C. with continuous stirring and sparging with nitrogen, after which 0.40 grams (0.080 weight percent based on total charge) of Catalyst II were added to the reaction flask. The contents in the reaction flask were then cooled to ambient temperature and maintained at ambient temperature for 4 days. The contents in the reaction flask were thereafter heated to a temperature of 100° C.-110° C. with continuous stirring, after which 78.4 grams (0.56 moles) of Epoxide III were added to the reaction flask. Following a period of 2-3 minutes after addition of Epoxide III to the reaction flask, the system exothermed to a temperature of 160° C. The contents in the reaction flask were maintained at a temperature of 160° C. for a period of 45 minutes with continuous stirring. A nitrogen sparge was maintained throughout this reaction period. Samples were taken at intervals and analyzed for percent oxirane content. At the end of the 45 minute heating period, the oxirane content was measured as 0.02 percent and the reaction was terminated. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane: 0.02 percent
Viscosity at 54.5° C.: 986 centistokes
Hydroxyl No.: 416 mg KOH/gram
Acid No.: 3.83 mg KOH/gram
Water Content: 0.75 percent

EXAMPLE 8

Into a one liter four-necked round bottom reaction flask equipped with a nitrogen inlet and outlet port, mechanical stirrer, heating mantle and thermometer was added 420 grams (1.40 moles) of Polyol IV and 78.4 grams (0.56 moles) of Epoxide III. The contents in the reaction flask were heated to a temperature of 100° C. with continuous stirring and sparging with nitrogen, after which 0.40 grams (0.080 weight percent based on total charge) of Catalyst II were added to the reaction flask. The system exothermed to a temperature of 185° C. and was then cooled to a temperature of 160° C.-170° C. The contents in the reaction flask were maintained at a temperature of 160° C.-170° C. for a period of 30 minutes with continuous stirring. A nitrogen sparge was maintained throughout this reaction period. Samples were taken at intervals and analyzed for percent oxirane content. At the end of the 30 minute heating period, the oxirane content was measured as 0.00 percent and the reaction was terminated. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.00 percent
Viscosity at 54.5° C.: 925 centistokes
Hydroxyl No.: 415 mg KOH/gram
Acid No.: 5.61 mg KOH/gram
Water Content: 0.71 percent

EXAMPLE 9

Into a 2 liter four-necked round bottom reaction flask equipped with a nitrogen inlet and outlet port, mechanical stirrer, heating mantle and thermometer was added 630 grams (0.70 moles) of Polyol V. The polyol was heated to a temperature of 100° C. with continuous stirring and sparging with nitrogen, after which 0.374 grams (0.056 weight percent based on total charge) of Catalyst I were added to the reaction flask. The contents in the reaction flask were heated to a temperature of 140° C. with continuous stirring, after which 39.2 grams (0.28 moles) of Epoxide III were added into the reaction flask. The contents in the reaction flask were maintained at a temperature of 160° C.-170° C. for a period of 5 hours with continuous stirring. A nitrogen blanket was maintained throughout this reaction period (nitrogen sparge removed). Samples were taken at intervals and analyzed for percent oxirane content. At the end of the 5 hour heating period, the oxirane content was measured as 0.00 percent and the reaction was considered complete. After cooling to ambient temperature, the contents in the reaction flask were then collected as a residue product and, upon analysis, the residue product containing principally on the average a mixture of hexafunctional polyol adduct and unreacted trifunctional polyol was found to have the following properties:

Oxirane Content: 0.00 percent
Viscosity at 54.5° C.: 504 centistokes
Hydroxyl No.: 178 mg KOH/gram
Acid No.: 0.19 mg KOH/gram
Water Content: 0.00 percent

EXAMPLE 10

Into a 2 liter four-necked round bottom reaction flask equipped with a nitrogen inlet and outlet port, mechanical stirrer, heating mantle and thermometer was added 300 grams (1.0 moles) of Polyol IV. The polyol was heated to a temperature of 100° C. with continuous stirring and sparging with nitrogen, after which 0.278 grams (0.075 weight percent based on total charge) of Catalyst I were added to the reaction flask. The contents in the reaction flask were heated to a temperature of 140° C. with continuous stirring, after which 70 grams (0.50 moles) of Epoxide III were added into the reaction flask. The contents in the reaction flask were maintained at a temperature of 165° C. for a period of 2.5 hours with continuous stirring. A nitrogen blanket was maintained throughout this reaction period (nitrogen sparge removed). Samples were taken at intervals and analyzed for percent oxirane content. At the end of the 2.5 hour heating period, the oxirane content was measured as 0.00 percent and the reaction was considered complete. After cooling to ambient temperature, the contents in the reaction flask were then collected as a residue product and, upon analysis, the residue product containing principally on the average a hexafunctional polyol adduct was found to have the following properties:
 Oxirane Content: 0.00 percent
 Viscosity at 54.5° C.: 1506 centistokes
 Hydroxyl No.: 445.6 mg KOH/gram
 Acid No.: 0.18 mg KOH/gram
 Water Content: 0.00 percent

EXAMPLE 11

Into a 2 liter four-necked round bottom reaction flask equipped with a nitrogen inlet and outlet port, mechanical stirrer, heating mantle and thermometer was added 360 grams (0.667 moles) of Polyol III. The polyol was heated to a temperature of 100° C. with continuous stirring and sparging with nitrogen, after which 0.305 grams (0.075 weight percent based on total charge) of Catalyst I were added to the reaction flask. The contents in the reaction flask were heated to a temperature of 140° C. with continuous stirring, after which 46.6 grams (0.333 moles) of Epoxide III were added into the reaction flask. The contents in the reaction flask were maintained at a temperature of 165° C. for a period of 4.5 hours with continuous stirring. A nitrogen blanket was maintained throughout this reaction period (nitrogen sparge removed). Samples were taken at intervals and analyzed for percent oxirane content. At the end of the 4.5 hour heating period, the oxirane content was measured as 0.00 percent and the reaction was considered complete. After cooling to ambient temperature, the contents in the reaction flask were then collected as a residue product and, upon analysis, the residue product containing principally on the average a hexafunctional polyol adduct was found to have the following properties:
 Oxirane Content: 0.00 percent
 Viscosity at 54.5° C.: 657 centistokes
 Hydroxyl No.: 276 mg KOH/gram
 Acid No.: 0.16 mg KOH/gram
 Water Content: 0.00 percent

EXAMPLE 12

Into a 2 liter four-necked round bottom reaction flask equipped with a nitrogen inlet and outlet port, mechanical stirrer, heating mantle and thermometer was added 360 grams (0.40 moles) of Polyol V. The polyol was heated to a temperature of 100° C. with continuous stirring and sparging with nitrogen, after which 0.291 grams (0.075 weight percent based on total charge) of Catalyst I were added to the reaction flask. The contents in the reaction flask were heated to a temperature of 140° C. with continuous stirring, after which 28 grams (0.20 moles) of Epoxide III were added into the reaction flask. The contents in the reaction flask were maintained at a temperature of 165° C. for a period of 3.5 hours with continuous stirring. A nitrogen blanket was maintained throughout this reaction period (nitrogen sparge removed). Samples were taken at intervals and analyzed for percent oxirane content. At the end of the 3.5 hour heating period, the oxirane content was measured as 0.00 percent and the reaction was considered complete. After cooling to ambient temperature, the contents in the reaction flask were then collected as a residue product and, upon analysis, the residue product containing principally on the average a hexafunctional polyol adduct was found to have the following properties:
 Oxirane Content: 0.00 percent
 Viscosity at 54.5° C.: 646 centistokes
 Hydroxyl No.: 176.4 mg KOH/gram
 Acid No.: 0.17 mg KOH/gram
 Water Content: 0.00 percent

EXAMPLE 13

Into a 2 liter four-necked round bottom reaction flask equipped with a nitrogen inlet and outlet port, mechanical stirrer, heating mantle and thermometer was added 2775 grams (9.25 moles) of Polyol IV. The polyol was heated to a temperature of 100° C. with continuous stirring and sparging with nitrogen, after which 1.89 grams (0.05 weight percent based on total charge) of Catalyst I were added to the reaction flask. The contents in the reaction flask were than vacuum stripped for 10 minutes at 100° C. to remove any volatiles such as water in Catalyst I. After removal of the vacuum, a nitrogen sparge was again employed while the contents in the reaction flask were heated to 140° C. with continuous stirring. At a temperature of 140° C., 1014 grams (3.7 moles) of Epoxide I were added into the reaction flask. The contents in the reaction flask were maintained at a temperature of 140° C. for a period of 3.5 hours with continuous stirring. The contents in the reaction flask were further maintained at a temperature of 155° C.–157° C. for a period of 3.5 hours with continuous stirring. The contents in the reaction flask were also maintained at a temperature of 160° C. for a period of 1 hour with continuous stirring. A nitrogen blanket was maintained throughout these reaction periods (nitrogen sparge removed). Samples were taken at intervals and analyzed for percent oxirane content. At the end of the 1 hour heating period at a temperature of 160° C., the oxirane content was measured as 0.035 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:
 Oxirane Content: 0.035 percent
 Viscosity at 54.5° C.: 5429 centistokes
 Hydroxyl No.: 370.6 mg KOH/gram
 Acid No.: 0.16 mg KOH/gram
 Water Content: 0.00 percent

EXAMPLE 14

Into a 2 liter four-necked round bottom reaction flask equipped with a nitrogen inlet and outlet port, mechanical stirrer, heating mantle and thermometer was added 450 grams (1.5 moles) of Polyol IV, 540 grams (1.0 mole) of Polyol III, 274 grams (1.0 mole) of Epoxide I and 3.8 grams (0.30 weight percent based on total charge) of Catalyst I. The contents in the reaction flask were heated to a temperature of 150° C.-155° C. and maintained at this temperature for a period of 2.5 hours with continuous stirring. A nitrogen blanket was maintained throughout this reaction period. Samples were taken at intervals and analyzed for percent oxirane content. Before heating the contents in the reaction flask, the initial oxirane content was measured as 2.46 percent (2.53 percent theoretical). After 1.5 hours into the total 2.5 hour heating period, the oxirane content was measured as 0.015 percent. An oxirane content of 0.015 percent is considered a nil content since the first drop or two of titrant (approximately 0.10 cc) caused the indicator to change color. By way of comparison, the initial oxirane content measurement of 2.46 percent required 14.95 cc of titrant to change color of the indicator. After 2.0 hours into the total 2.5 hour heating period, the oxirane content was again measured as the same nil value. It was therefore determined that the reaction of oxirane with hydroxyl groups was complete after 1.5 hours or less at a reaction temperature of 150° C.-155° C. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.015 percent (nil)
Viscosity at 54.5° C.: 2911 centistokes
Hydroxyl No.: 325 mg KOH/gram
Acid No.: 0.69 mg KOH/gram
Water Content: 0.00 percent A comparison with Comparative Examples B and D reveals that the product of this example was made in a much shorter time and had a significantly lower viscosity and oxirane content than the products of Comparative Examples B and D.

EXAMPLE 15

Into a 2 liter four-necked round bottom reaction flask equipped with a nitrogen inlet and outlet port, mechanical stirrer, heating mantle and thermometer was added 450 grams (1.5 moles) of Polyol IV and 540 grams (1.0 mole) of Polyol III. The polyols were heated to a temperature of 140° C. with continuous stirring, after which 274 grams (1.0 mole) of Epoxide I and 0.63 grams (0.05 weight percent based on total charge) of Catalyst I were added to the reaction flask. The contents in the reaction flask were maintained at a temperature of 140° C.-145° C. for a period of 4 hours with continuous stirring. A nitrogen blanket was maintained throughout this reaction period. Samples were taken at intervals and analyzed for percent oxirane content. At the end of the 4 hour heating period, the oxirane content was measured as 0.04 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.04 percent
Viscosity at 54.5° C.: 2864 centistokes
Hydroxyl No.: 344.7 mg KOH/gram
Acid No.: 0.19 mg KOH/gram

EXAMPLE 16

Into a 2 liter four-necked round bottom reaction flask equipped with a nitrogen inlet and outlet port, mechanical stirrer, heating mantle and thermometer was added 766.4 grams (0.25 moles) of Polyol VI. The polyol was heated to a temperature of 110° C.-120° C. with continuous stirring, after which 27.4 grams (0.10 moles) of Epoxide I and 0.40 grams (0.050 weight percent based on total charge) of Catalyst I were added to the reaction flask. The contents in the reaction flask were then heated to a temperature of 170° C. for a period of 0.5 hours with continuous stirring. A nitrogen blanket was maintained throughout the reaction period. When the temperature reached about 140° C.-150° C., an exotherm of 10° C. to 20° C. was noticed. At the end of the 0.5 hour heating period, the oxirane content was measured as 0.00 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

Oxirane Content: 0.00 percent
Viscosity at 130° F.: 4306 centistokes
Hydroxyl No.: 39.2 mg. KOH/gram
Acid No.: 0.72 mg. KOH/gram

EXAMPLE 17

Into a 2 liter four-necked round bottom reaction flask equipped with a nitrogen inlet and outlet port, mechanical stirrer, heating mantle and thermometer was added 450 grams (1.5 moles) of Polyol IV and 540 grams (1.0 mole) of Polyol III. The polyols were heated to a temperature of 100° C. with continuous stirring and sparging with nitrogen, after which 1.26 grams (0.09 weight percent based on total charge) of Catalyst I were added to the reaction flask. The polyols and catalyst were further heated to a temperature of 140° C. with continuous stirring and sparging with nitrogen, after which 377 grams (1.0 mole) of Epoxide IV was added to the reaction flask. The contents in the reaction flask were then heated to a temperature of 170° C.-175° C. and maintained at this temperature for a period of 22 hours with continuous stirring. A nitrogen blanket was maintained throughout the reaction period after the addition of Epoxide IV at 140° C. (nitrogen sparge removed). Samples were taken at intervals and analyzed for percent oxirane content. After 3 hours into the total 22 hour heating period, the oxirane content was measured as 1.88 percent. At the end of the 22 hour heating period the oxirane content was measured as 0.40 percent and the reaction was terminated. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.40 percent
Viscosity at 54.5° C.: 6500 centistokes
Hydroxyl No.: 280 mg. KOH/gram
Acid No.: 0.23 mg. KOH/gram The above procedure was repeated at a higher reaction temperature and a higher catalyst concentration as follows: Into a 2 liter four-necked round bottom reaction flask equipped with a nitrogen inlet and outlet port, mechanical stirrer, heating mantle and thermometer was added 450 grams (1.5 moles) of Polyol IV and 540 grams (1.0 mole) of Polyol III. The polyols were heated to a temperature of 100° C. with continuous stirring and sparging with nitrogen, after which 4.11 grams (0.3 weight percent based on total charge) of Catalyst I were added to the reaction flask. The polyols and catalyst were further heated to a temperature of 140° C. with continuous stirring and sparging with nitrogen, after which 377 grams (1.0 mole) of Epoxide IV was added to the reaction flask. The contents in the reaction flask were then heated to a temperature of 177° C. and maintained at this temperature for a period of 1 hour with continuous stirring. A nitrogen blanket was maintained throughout the reaction period after the addition of Epoxide IV at 140° C. (nitrogen sparge removed). At the end of the 1 hour heating period, the oxirane content was measured as 0.04 percent and the reaction was terminated. After cooling to ambient temperature, the contents in the reaction flask were then collected as a residue product and upon analysis, the residue product containing principally on the average a mixture of a hexafunctional polyol adduct and unreacted trifunctional polyol was found to have the following properties:

Oxirane Content: 0.04 percent
Viscosity at 54.5° C.: 4478 centistokes
Hydroxyl No.: 304.5 mg. KOH/gram
Acid No.: 0.56 mg. KOH/gram
Water Content: 0.04 percent

EXAMPLE 18

Into a 2 liter four-necked round bottom reaction flask equipped with a nitrogen inlet and outlet port, mechanical stirrer, heating mantle and thermometer was added 1350 grams (4.5 moles) of Polyol IV and 1620 grams (3.0 moles) of Polyol III. The polyols were heated to a temperature of 100° C. with continuous stirring and sparging with nitrogen, after which 1.89 grams (0.05 weight percent based on total charge) of Catalyst I were added to the reaction flask. The contents in the reaction flask were then vacuum stripped for 10 minutes at 100° C. to remove any volatiles such as water in Catalyst I. After removal of the vacuum, a nitrogen sparge was again employed while the contents in the reaction flask were heated to 140° C. with continuous stirring. At a temperature of 140° C., 822 grams (3 moles) of Epoxide I were added into the reaction flask. The contents in the reaction flask were maintained at a temperature of 146° C.-164° C. for a period of 2.75 hours with continuous stirring. A nitrogen blanket was maintained throughout this reaction period (nitrogen sparge removed). Samples were taken at intervals and analyzed for percent oxirane content. At the end of the 2.75 hour heating period, the oxirane content was measured as 0.02 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.02 percent
Viscosity at 54.5° C.: 2410 centistokes
Hydroxyl No.: 329 mg. KOH/gram
Acid No.: 0.48 mg. KOH/gram
Water Content: 0.10 percent

EXAMPLE 19

Into a 2 liter four-necked round bottom reaction flask equipped with a nitrogen inlet and outlet port, mechanical stirrer, heating mantle and thermometer was added 1350 grams (4.5 moles) of Polyol IV and 1620 grams (3.0 moles) of Polyol III. The polyols were heated to a temperature of 100° C. with continuous stirring and sparging with nitrogen, after which 1.89 grams (0.05 weight percent based on total charge) of Catalyst I were added to the reaction flask. The contents in the reaction flask were then vacuum stripped for 10 minutes at 100° C. to remove any volatiles such as water in Catalyst I. After removal of the vacuum, a nitrogen sparge was again employed while the contents in the reaction flask were heated to 140° C. with continuous stirring. At a temperature of 140° C., 822 grams (3 moles) of Epoxide I were added into the reaction flask. The contents in the reaction flask were maintained at a temperature of 140° C.-210° C. for a period of 2.5 hours with continuous stirring. A nitrogen blanket was maintained throughout this reaction period (nitrogen sparge removed). Samples were taken at intervals and analyzed for percent oxirane content. At the end of the 2.5 hour heating period, the oxirane content was measured as 0.02 percent and the reaction was considered complete. After cooling to ambient temperature, the contents in the reaction flask were then collected as a residue product and, upon analysis, the residue product containing principally on the average a mixture of a hexafunctional polyol adduct and unreacted trifunctional polyol was found to have the following properties:

Oxirane Content: 0.02 percent
Viscosity at 54.5° C.: 2252 centistokes
Hydroxyl No.: 310 mg. KOH/gram
Acid No.: 0.27 mg. KOH/gram

EXAMPLE 20

Into a 2 liter four-necked round bottom reaction flask equipped with a nitrogen inlet and outlet port, mechanical stirrer, heating mantle and thermometer was added 632 grams (0.76 moles) of Polyol II, 540 grams (1.0 mole) of Polyol III and 450 grams (1.5 moles) of Polyol IV. The polyols were heated to a temperature of 140° C. with continuous stirring and sparging with nitrogen, after which 274 grams (1.0 mole) of Epoxide I and 0.63 grams (0.033 weight percent based on total charge) of Catalyst II were added to the reaction flask. The contents in the reaction flask were maintained at a temperature of 145° C.-155° C. for a period of 4 hours with continuous stirring. A nitrogen blanket was maintained throughout this reaction period (nitrogen sparge removed). Samples were taken at intervals and analyzed for percent oxirane content. After 1 hour into the total 4 hour heating period at a temperature of 155° C., the oxirane content was measured as 0.97 percent. After 1.5 hours into the total 4 hour heating period at a temperature of 150° C., the oxirane content was measured at 0.26 percent. After 3.0 hours into the total 4 hour heating period at a temperature of 150° C., the oxirane content was measured as 0.05 percent. At the end of the 4 hour heating period, the oxirane content was measured as 0.01 percent and the reaction was terminated. After cooling to ambient temperature, the contents in the reaction flask were then collected as a residue product and, upon analysis, the residue product containing principally on the average a mixture of a hexafunctional polyol adduct, pentafunctional polyol adduct, tetrafunctional polyol adduct, unreacted trifunctional polyol and unreacted difunctional polyol was found to have the following properties:

Oxirane Content: 0.01 percent
Viscosity at 54.5° C.: 614 centistokes
Hydroxyl No.: 267 mg. KOH/gram
Acid No.: 0.15 mg. KOH/gram
Water Content: 0.02 percent

EXAMPLES 21 THROUGH 32

Into glass bottles was added various specified combinations of Epoxide I, Epoxide IV, Polyol Adduct I, Polyol Adduct II, Polyol Adduct IV, Polyol Adduct V, Catalyst I and Surfactant I in the amounts specified for each example in Table I below. The contents in the bottles were thoroughly blended until homogeneous by simple stirring at a temperature of 40° C. -50° C.

TABLE I

| Ingredients, grams | Example | | | | | |
|---|---|---|---|---|---|---|
| | 21 | 22 | 23 | 24 | 25 | 26 |
| Epoxide I | 18.75 | 16.25 | 18.75 | 18.75 | 18.75 | 16.25 |
| Epoxide IV | — | 2.50 | — | — | — | 2.50 |
| Polyol Adduct I | — | — | 6.25 | — | — | — |
| Polyol Adduct II | 6.25 | 6.25 | — | — | — | — |
| Polyol Adduct IV | — | — | — | — | 6.25 | — |
| Polyol Adduct V | — | — | — | 6.25 | — | 6.25 |
| Catalyst I | 0.25 | 0.25 | 0.25 | 0.25 | 0.25 | 0.25 |
| Surfactant I | 0.13 | 0.13 | 0.13 | 0.13 | 0.13 | 0.13 |

The blended formulations were then applied to Bonderite 37 ® treated steel panels using a Number 20 wirewound rod and cured in a forced-air oven at 121.1° C. for 20 minutes. One Bonderite 37 ® treated steel panel coated with the specified blended formulation was prepared for each example. The cured coatings on the Bonderite 37 ® treated steel panels of Examples 27 through 32 were prepared from the blended formulations of Examples 21 through 26 respectively. The thickness of the coatings vaired from about 0.85 mils to about 1.1 mils. After cooling to ambient temperature, the cured coatings were tested for the properties designated in Table II and the results of such testing are given in Table II.

TABLE II

| Properties | Example | | | | | |
|---|---|---|---|---|---|---|
| | 27 | 28 | 29 | 30 | 31 | 32 |
| Double Acetone Rubs | 100(1) | 100(1) | 100(1) | 100(1) | 100(1) | 100(1) |
| Pencil Hardness | 2H | 4H | 4H | 4H | 3H | 4H |
| % Crosshatch Adhesion | 100 | 100 | 100 | 100 | 100 | 100 |
| Gardner Impact, in. lbs. | | | | | | |
| Forward | >320 | >320 | 150 | 125 | 200 | 200 |
| Reverse | 300 | >320 | 50 | 75 | 175 | 175 |

The cured coatings were also immersed in water at ambient temperature for a period of 4 days. After 3.5 hours into the total 4 day immersion period, the cured coatings had 100% crosshatch adhesion and a 4H pencil hardness except for the cured coating of Example 27 which had a 2H pencil hardness. After 3 days into the total 4 day immersion period, the cured coating of Example 32 had 100% crosshatch adhesion and a 4H pencil hardness. At the end of the 4 day immersion period, the cured coatings of Examples 28, 29, 30, and 31 had 100% crosshatch adhesion and a 4H pencil hardness. At the end of the 4 day immersion period, the cured coating of Example 27 had a 50% crosshatch adhesion and a 2H pencil hardness.

EXAMPLES 33 through 38

Into brown glass bottles under a yellow light source was added Epoxide I, Photoinitiator I, Surfactant I and Polyol Adduct III in the amounts specified for each example in Table III below. The contents in the bottles were thoroughly blended until homogeneous by simple stirring at ambient temperature. The viscosity of the resulting blends prepared in each example was then determined with a Brookfield viscometer at 25° C. (centipoise). The viscosity results are given in Table III.

TABLE III

| | Example | | |
|---|---|---|---|
| | 33 | 34 | 35 |
| Ingredients, grams | | | |
| Epoxide I | 76.3 | 63.5 | 58.6 |
| Photoinitiator I | 4.0 | 4.0 | 4.0 |
| Surfactant I | 0.5 | 0.5 | 0.5 |
| Polyol Adduct III | 19.2 | 32.0 | 36.9 |
| Properties | | | |
| Viscosity, centipoise | 1020 | 1768 | 2170 |

The blended formulations were then applied to Bonderite 37 ® treated steel panels using a Number 20 wirewound rod and cured with one pass under a 100 watt per inch, medium pressure, mercury lamp ultraviolet light source at 30 feet per minuts. One Bonderite 37 ® treated steel panel coated with the specified blended formulation was prepared for each example. The cured coatings on the Bonderite 37 ® treated steel panels of Examples 36, 37, and 38 were prepared from the blended formulations of Examples 33, 34, and 35 respectively. The thickness of the coatings varied from about 0.85 mils to about 0.95 mils. The cured coatings were tested for the properties designated in Table IV and the results of such testing are given in Table IV.

TABLE IV

| Properties | Example | | |
|---|---|---|---|
| | 36 | 37 | 38 |
| Double Acetone Rubs | >100 | >100 | >100 |
| Pencil Hardness | H | F | F |
| % Crosshatch Adhesion | 100 | 100 | 100 |
| Gardner Impact, in. lbs. | | | |
| Forward | 50 | 125 | >320 |
| Reverse | 5 | 50 | >320 |
| Film Thickness, mils | 0.85 | 0.88 | 0.95 |

Table IV shows Polyol Adduct III functions as a modifier that improves the flexibility of the cured coatings. The impact strength of the cured coatings shows marked improvement as the concentration of Polyol Adduct III increases in the coating formulation.

EXAMPLES 39 THROUGH 54

Into brown glass bottles under a yellow light source was added various specified combinations of Epoxide I, Epoxide IV, Photoinitiator I, Photoinitiator II, Surfactant I, Polyol Adduct I and Polyol Adduct IV in the amounts specified for each example in Table V below. The contents in the bottles were thoroughly blended until homogeneous by simple stirring at ambient temperature.

TABLE V

| Ingredients, grams | Example | | | | | | | |
|---|---|---|---|---|---|---|---|---|
| | 39 | 40 | 41 | 42 | 43 | 44 | 45 | 46 |
| Epoxide I | 21.38 | 20.13 | 18.88 | 17.63 | 21.38 | 18.88 | 17.63 | 16.38 |
| Epoxide V | — | 1.25 | 2.50 | 1.25 | — | 2.50 | 1.25 | 2.50 |
| Photoinitiator I | 1.0 | 1.0 | 1.0 | 1.0 | 1.0 | 1.0 | — | — |
| Photoinitiator II | — | — | — | — | — | — | 1.0 | 1.0 |
| Surfactant I | 0.13 | 0.13 | 0.13 | 0.13 | 0.13 | 0.13 | 0.13 | 0.13 |
| Polyol Adduct I | — | — | — | — | 2.5 | 2.5 | 5.0 | 5.0 |
| Polyol Adduct IV | 2.5 | 2.5 | 2.5 | 5.0 | — | — | — | — |

EXAMPLES 55 THROUGH 76

Examples 55 through 76 illustrate the utility of the low viscosity adducts of a polycaprolactone polyol and a polyepoxide in melamine (urea-formaldehyde) cross-linked systems. Into glass bottles was added various specified combinations of Melamine I, Polyol Adduct I, Polyol Adduct II, Polyol Adduct III, Polyol Adduct V, Catalyst IV, Surfactant I, and Solvent I in the amounts specified for each example in Table VII below. The contents in the bottles were thoroughly blended until homogeneous by simple stirring at a temperatue of 40° C. -50° C.

TABLE VII

| Ingredients, grams | Example | | | | | | | | | | |
|---|---|---|---|---|---|---|---|---|---|---|---|
| | 55 | 56 | 57 | 58 | 59 | 60 | 61 | 62 | 63 | 64 | 65 |
| Melamine I | 6.0 | 6.5 | 7.0 | 5.0 | 6.0 | 5.0 | 6.0 | 6.8 | 5.0 | 6.0 | 7.0 |
| Polyol Adduct I | 12.3 | 12.3 | 12.3 | — | — | — | — | — | — | — | — |
| Polyol Adduct II | — | — | — | — | — | 3.78 | 3.78 | 3.78 | — | — | — |
| Polyol Adduct III | — | — | — | 4.6 | 4.6 | — | — | — | — | — | — |
| Polyol Adduct V | — | — | — | — | — | — | — | — | 5.25 | 5.25 | 5.25 |
| Catalyst IV | 0.45 | 0.48 | 0.48 | 0.25 | 0.28 | 0.23 | 0.25 | 0.28 | 0.25 | 0.28 | 0.30 |
| Surfactant I | 0.09 | 0.095 | 0.10 | 0.05 | 0.05 | 0.05 | 0.05 | 0.05 | 0.05 | 0.06 | 0.06 |
| Solvent I | 11.18 | 11.40 | 11.65 | 5.40 | 5.98 | 4.95 | 5.43 | 5.80 | 5.93 | 6.43 | 6.90 |

The blended formulations were then applied to Bonderite 37 ® treated steel panels using a Number 20 wirewound rod and cured with one pass under a 100 watt per inch, medium pressure, mercury lamp ultraviolet light source at 30 feet per minute. One Bonderite 37 ® treated steel panel coated with the specified blended formulation was prepared for each example. The cured coatings on the Bonderite 37 ® treated steel panels of Examples 47 through 54 were prepared from the blended formulations of Examples 39 through 46 respectively. The thickness of the coatings varied from about 0.85 mils to about 1.1 mils. The cured coatings were tested 3 days after the ultraviolet light exposure for the properties designated in Table VI and the results of such testing are given in Table VI.

The blended formulations were then applied to Bonderite 37 ® treated steel panels using a Number 60 wirewound rod. The wet films were air dried for about 5-10 minutes and cured in a forced-air oven at 130° C. for 30 minutes. Some specified examples in Table VIII below were further cured in a forced-air oven at 170° C. for an additional 20 minutes. One Bonderite 37 ® treated steel panel coated with the specified blended formulation was prepared for each example. The cured coatings on the Bonderite 37 ® treated steel panels of Examples 66 through 76 were prepared from the blended formulations of Examples 55 through 65 respectively. The thickness of the coatings varied from about 0.85 mils to about 1.1 mils. After cooling to ambient temperature, the cured coatings were tested for the properties designated in Table VIII and the results of such testing are given in Table VIII.

TABLE VI

| Properties | Example | | | | | | | |
|---|---|---|---|---|---|---|---|---|
| | 47 | 48 | 49 | 50 | 51 | 52 | 53 | 54 |
| Double Acetone Rubs | 80(4) | 100(2) | 100(2) | 50(4) | 100(1) | 100(3) | 100(1) | 60(4) |
| Pencil Hardness | 2H | 2H | 2H | 2H | 3H | 3H | 2H | 2H |
| % Crosshatch Adhesion | 100 | 100 | 100 | 100 | 100 | 100 | 100 | 100 |
| Gardner Impact, in. lbs. | | | | | | | | |
| Forward | 50 | 25 | 25 | >320 | 25 | 25 | 25 | 25 |
| Reverse | 10 | <5 | <5 | >320 | <5 | <5 | <5 | <5 |
| Water Immersion Resistance (3 Hrs. at Room Temperature) | | | | | | | | |
| % Crosshatch Adhesion | 0 | 0 | 5 | 16 | 10 | 100 | 0 | 5 |
| Pencil Hardness | 2B | HB | F | F | HB | HB | 5B | 5B |

TABLE VIII

| | Example | | | | | | | | | | |
|---|---|---|---|---|---|---|---|---|---|---|---|
| | 66 | 67 | 68 | 69 | 70 | 71 | 72 | 73 | 74 | 75 | 76 |
| Properties After 30 Minute, 130° C. Thermal Cure | | | | | | | | | | | |
| Double Acetone Rubs | 100(1) | 100(1) | 100(1) | 100(1) | 100(1) | 100(1) | 100(1) | 100(1) | 100(1) | 100(1) | 100(1) |
| Pencil Hardness | HB | HB | F | H | H | H | H | H | 2H | 4H | 3H |
| % Crosshatch Adhesion | 0 | 0 | 0 | 5 | 16 | 0 | 10 | 50 | 15 | 12 | 4 |

TABLE VIII-continued

| | Example | | | | | | | | | | |
|---|---|---|---|---|---|---|---|---|---|---|---|
| | 66 | 67 | 68 | 69 | 70 | 71 | 72 | 73 | 74 | 75 | 76 |
| Gardner Impact in lbs. | | | | | | | | | | | |
| Forward | 75 | 75 | 50 | 15 | 25 | 15 | 15 | 15 | 25 | 25 | 25 |
| Reverse | 15 | 25 | 15 | <5 | <5 | <5 | <5 | <5 | <5 | <5 | <5 |
| Properties After Additional 20 Minute, 170° C. Thermal Cure | | | | | | | | | | | |
| % Crosshatch Adhesion | 100 | — | — | 20 | — | 10 | — | 95 | — | — | — |

EXAMPLES 77 THROUGH 96

Into brown glass bottles under a yellow light source was added various specified combinations of Epoxide I, Epoxide V, Epoxide VI, Photoinitiator I, Photoinitiator II, Surfactant I, Polyol Adduct II, Polyol Adduct V and Polyol Adduct VI in the amounts specified for each example in Table IX below. The contents in the bottles were thoroughly blended until homogeneous by simple stirring at ambient temperature.

TABLE IX

| | Example | | | | | | | | | |
|---|---|---|---|---|---|---|---|---|---|---|
| Ingredients, grams | 77 | 78 | 79 | 80 | 81 | 82 | 83 | 84 | 85 | 86 |
| Epoxide I | 22.25 | 15.80 | 21.65 | 16.95 | 21.73 | 20.80 | 18.43 | 18.30 | 18.30 | 15.93 |
| Epoxide V | — | 3.75 | — | 3.75 | — | — | — | 2.50 | — | 1.25 |
| Epoxide VI | — | — | — | — | — | — | — | — | 2.50 | 1.25 |
| Photoinitiator I | 1.0 | 1.0 | 1.0 | 1.0 | 1.0 | 1.0 | 1.0 | 1.0 | — | 0.5 |
| Photoinitiator II | — | — | — | — | — | — | — | — | 1.0 | 0.5 |
| Surfactant I | 0.13 | 0.13 | 0.13 | 0.13 | 0.13 | 0.13 | 0.13 | 0.13 | 0.13 | 0.13 |
| Polyol Adduct II | 1.63 | 4.33 | — | — | — | — | — | — | — | — |
| Polyol Adduct V | — | — | 2.23 | 3.18 | — | — | — | — | — | — |
| Polyol Adduct VI | — | — | — | — | 2.15 | 3.08 | 5.45 | 3.08 | 3.08 | 5.45 |

The blended formulations were then applied to Bonderite 37 ® treated steel panels using a Number 20 wire-wound rod and cured with one pass under a 300 watt per inch, medium pressure, mercury lamp ultraviolet light source at 10 feet per minute. One Bonderite 37 ® treated steel panel coated with the specified blended formulation was prepared for each example. The cured coatings on the Bonderite 37 ® treated steel panels of Examples 87 through 96 were prepared from the blended formulations of Examples 77 through 86 respectively. The thickness of the coatings varied from about 0.85 mils to about 1.1 mils. All coatings were hard and tack free immediately after ultraviolet light exposure. The cured coatings were tested for the properties designated in Table X and the results of such testing are given in Table X.

TABLE X

| | Example | | | | | | | | | |
|---|---|---|---|---|---|---|---|---|---|---|
| Properties | 87 | 88 | 89 | 90 | 91 | 92 | 93 | 94 | 95 | 96 |
| Double Acetone Rubs | 100(1) | 100(1) | 100(1) | 100(1) | 100(1) | 100(1) | 50(4) | 40(4) | 40(4) | 35(4) |
| Pencil Hardness | 3H | 3H | 3H | 3H | 3H | 4H | 3H | 3H | 2H | 3H |
| % Crosshatch Adhesion | 100 | 100 | 100 | 100 | 100 | 100 | 100 | 100 | 100 | 100 |
| Gardner Impact, in lbs. | | | | | | | | | | |
| Forward | 15 | 10 | 15 | 25 | 15 | 25 | 15 | 15 | 25 | 50 |
| Reverse | <5 | <5 | <5 | <5 | <5 | <5 | <5 | <5 | <5 | 25 |
| Water Immersion Resistance (6 Hrs. at Room Temperature) | | | | | | | | | | |
| % Crosshatch Adhesion | 100 | 25 | 50 | 25 | 95 | 50 | 75 | 5 | 0 | 0 |
| Pencil Hardness | 2B | 3B | B | 2B | 3B | 4B | 2B | 2B | 6B | 6B |
| Water Immersion Resistance (6 Days at Room Temperature) | | | | | | | | | | |
| % Crosshatch Adhesion | 100 | — | — | — | 50 | — | 90 | — | — | — |
| Pencil Hardness | 4B | — | — | — | 3B | — | 4B | — | — | — |

What is claimed is:

1. Curable coating composition comprising: (1) a polyepoxide containing two or more epoxy groups per molecule, or an amino-formaldehyde resin; (2) an adduct of a polycaprolactone polyol and a polyepoxide comprising the reaction product of at least one polycaprolactone polyol and a polyglycidyl epoxide containing two or more epoxy groups per molecule, said polycaprolactone polyol being employed in an amount at least sufficient to effect substantially complete reaction of the epoxy groups of the polyglycidyl epoxide; and (3) a catalyst or a photoinitiator.

2. The curable coating composition as defined in claim 1 further including a substituted cycloaliphatic epoxide.

3. A cured film coating prepared from the curable coating composition of claim 1.

4. Curable coating composition comprising: (1) a polyepoxide containing two or more epoxy groups per molecule, or an amino-formaldehyde resin; (2) an adduct of a polycaprolactone polyol and a polyepoxide comprising the reaction product of at least one polycaprolactone polyol and a polyepoxide containing two or more epoxy groups per molecule in a molar ratio of polycaprolactone polyol to polyepoxide of from about 2:1 to about 3:1, said adduct having an oxirane content of less than about 0.10 percent and a viscosity of less than about 3700 centistokes at 54.5° C.; and (3) a catalyst or a photoinitiator.

5. The curable coating composition as defined in claim 3 further including a substituted cycloaliphatic epoxide.

6. The curable coating composition as defined in claim 5 wherein the cycloaliphatic epoxide has the formula:

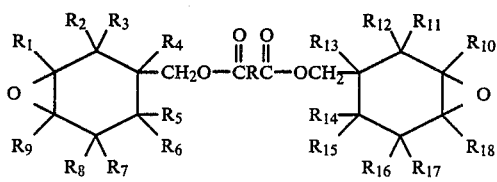

wherein $R_1$ through $R_{18}$, which can be the same or different, are hydrogen or alkyl radicals generally containing one to nine carbon atoms inclusive; and R is a valence bond or a divalent hydrocarbon radical generally containing one to twenty carbon atoms inclusive.

7. The curable coating composition as defined in claim 5 wherein the cycloaliphatic epoxide has the formula:

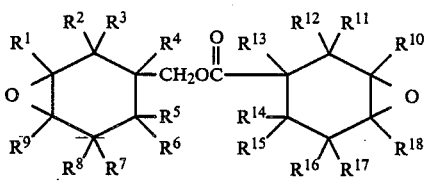

wherein $R^1$ through $R^{18}$, which can be the same or different are hydrogen or alkyl radicals generally containing one to nine carbon atoms inclusive.

8. The curable coating composition as defined in claim 5 wherein the cycloaliphatic epoxide has the formula:

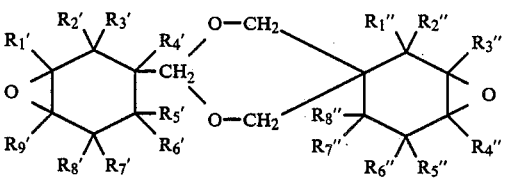

wherein the R prime and double prime groups are the same or different and are monovalent substitutes or monovalent hydrocarbon radicals.

9. The curable coating composition as defined in claim 5 wherein the cycloaliphatic epoxide is 3.4-epoxycyclohexylmethyl-3,4-epoxycyclohexane carboxylate.

10. The curable coating composition as defined in claim 5 wherein the cycloaliphatic epoxide is bis(3,4-epoxycyclohexylmethyl)adipate.

11. The curable coating composition as defined in claim 5 wherein the cycloaliphatic epoxide is vinylcyclohexene diepoxide.

12. The curable coating composition as defined in claim 4 wherein the polyepoxide containing two or more epoxy groups per molecule is a polyglycidyl epoxide.

13. The curable coating composition as defined in claim 12 wherein the polyglycidyl epoxide is a diglycidyl ether of Bisphenol A.

14. The curable coating composition as defined in claim 4 wherein the polyepoxide containing two or more epoxy groups per molecule is a mixture of a cycloaliphatic epoxide and a polyglycidyl epoxide.

15. The curable coating composition as defined in claim 4 wherein component (1) is a polyepoxide containing two or more epoxy groups per molecule.

16. The curable coating composition as defined in claim 4 wherein component (1) is an amino-formaldehyde resin.

17. The curable coating composition as defined in claim 16 wherein the amino-formaldehyde resin is a melamine formaldehyde resin, a urea formaldehyde resin or a benzoguanamine formaldehyde resin.

18. The curable coating composition as defined in claim 4 wherein the polycaprolactone polyol is a polycaprolactone triol.

19. The curable coating composition as defined in claim 4 wherein the polycaprolactone polyol is a polycaprolactone diol.

20. The curable coating composition as defined in claim 4 wherein the polycaprolactone polyol is a mixture of a polcaprolactone triol and a polycaprolactone diol.

21. Cured film coating prepared from the curable coating composition of claim 4.

22. Curable coating composition comprising: (1) a polyepoxide containing two or more epoxy groups per molecule, or an amino-formaldehyde resin; (2) an adduct of a polycaprolactone polyol and a polyepoxide comprising the reaction product of one polycaprolactone polyol and a polyepoxide containing two or more epoxy groups per molecule in a molar ratio of polycaprolactone polyol to polyepoxide of from about 2:1 to about 3:1, said adduct having an oxirane content of less than about 0.50 percent and a viscosity of less than about 20,000 centistokes at 54.5° C.; and (3) a catalyst or a photoinitiator.

23. The curable coating composition as defined in claim 22 further including a substituted cycloaliphatic epoxide.

24. The cured film prepared from the curable coating composition of claim 22.

25. Curable coating composition comprising: (1) a polyepoxide containing two or more epoxy groups per molecule, or an amino-formaldehyde; (2) a low viscosity adduct of a polycaprolactone polyol and a polyepoxide; and (3) a catalyst or a photoinitiator, said adduct being prepared by the process comprises reacting at least one polycaprolactone polyol and a polyepoxide containing two or more epoxy groups per molecule in the presence of a sulfonic acid catalyst or derivative thereof at a temperature of from about 80° to about 225° C., said polycaprolactone polyol, polyepoxide and sulfonic acid catalyst or derivative thereof being employed in an amount at least sufficient to effect substantially complete reaction of the epoxy groups of the polyepoxide to give an oxirane content of less than about 0.10 percent and in a sufficiently short period of time or less than about 6 hours whereby to minimize the formation of high viscosity product.

26. The curable coating composition as defined in claim 25 further including a substituted cycloaliphatic epoxide.

27. Cured film coating prepared from the curable coating composition of claim 25.

28. Curable coating composition comprising: (1) a polyepoxide containing two or more epoxy groups per molecule, or an amino-formaldehyde resin; (2) an adduct of a polycaprolactone polyol and a polyepoxide; and (3) a catalyst or a photointiator, said adduct being prepared by the process for preparing a low viscosity adduct of a polycaprolactone polyol and a polyepoxide which process comprises reacting at least one polycaprolactone polyol and a polyglycidyl epoxide containing two or more epoxy groups per molecule in the presence of a sulfonic acid catalyst or derivative thereof at a temperature of from about 80° C., said polycaprolactone polyol, polyglycidyl epoxide and sulfonic acid catalyst or derivative thereof being employed in an amount at least sufficient to effect substantially complete reaction of the epoxy groups of the polyglycidyl epoxide in a sufficiently short period of time whereby to minimize the formation of a high viscosity product.

29. The curable coating composition as defined in claim 28 further including a substituted cycloaliphatic epoxide.

30. Cured film coating prepared from the curable coating composition of claim 28.

31. Curable coating composition comprising: (1) a polyepoxide containing two or more epoxy groups per molecule, or an amino-formaldehyde resin; (2) an adduct of a polycaprolactone polyol and a polyepoxide; and (3) a catalyst or a photoinitiator, said adduct being prepared by the process for preparing a low viscosity adduct of a polycaprolactone polyol and a polyepoxide which process comprises reacting one polycaprolactone polyol and a polyepoxide containing two or more epoxy groups per molecule in the presence of a sulfonic acid catalyst or derivative thereof at a temperature of from about 80° C. to about 225° C., said polycaprolactone polyol, polyepoxide and sulfonic acid catalyst or derivative thereof being employed in an amount at least sufficient to effect substantially complete reaction of the epoxy groups of the polyepoxide in a sufficiently short period of time whereby to minimize the formation of a high viscosity product.

32. The curable coating composition as defined in claim 31 further including a substituted cycloaliphatic epoxide.

33. Cured film coating prepared from the curable coating composition of claim 31.

34. Curable coating composition comprising: (1) a polyisocyanate; (2) an adduct of a polycaprolactone polyol and a polyepoxide comprising the reaction product of at least one polycaprolactone polyol and a polyepoxide containing two or more epoxy groups per molecule in a molar ratio of polycaprolactone polyol to polyepoxide of from about 2:1 to about 3:1, said adduct having an oxirane content of less than about 0.10 percent and a viscosity of less about about 3700 centisokes at 54.5° C.; and (3) a catalyst or a photoinitiator.

* * * * *